(12) United States Patent
Arita et al.

(10) Patent No.: US 10,074,179 B2
(45) Date of Patent: Sep. 11, 2018

(54) IMAGE MEASUREMENT DEVICE

(71) Applicant: Sharp Kabushiki Kaisha, Osaka-shi, Osaka (JP)

(72) Inventors: Shinichi Arita, Osaka (JP); Kei Tokui, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 67 days.

(21) Appl. No.: 14/888,539

(22) PCT Filed: Apr. 28, 2014

(86) PCT No.: PCT/JP2014/061823
§ 371 (c)(1),
(2) Date: Nov. 2, 2015

(87) PCT Pub. No.: WO2014/181725
PCT Pub. Date: Nov. 13, 2014

(65) Prior Publication Data
US 2016/0086322 A1    Mar. 24, 2016

(30) Foreign Application Priority Data

May 27, 2013    (JP) ................................ 2013-097837

(51) Int. Cl.
*G06K 9/00*    (2006.01)
*G06T 7/00*    (2017.01)
(Continued)

(52) U.S. Cl.
CPC .............. *G06T 7/003* (2013.01); *E01B 35/02* (2013.01); *E01B 35/06* (2013.01); *G01B 11/02* (2013.01);
(Continued)

(58) Field of Classification Search
None
See application file for complete search history.

(56) References Cited

U.S. PATENT DOCUMENTS

2011/0249117 A1    10/2011    Yoshihama et al.
2014/0340498 A1*   11/2014    Plagemann ............ G01B 11/14
                                                                    348/77

FOREIGN PATENT DOCUMENTS

JP    11-281327 A    10/1999
JP    2011-232330 A    11/2011

OTHER PUBLICATIONS

Image Dimension Measuring System IM-6600 User's Manual, Japan, Keyence Corporation, Dec. 19, 2012, First Edition, 4-25 to 4-31.

(Continued)

*Primary Examiner* — Sumati Lefkowitz
*Assistant Examiner* — David Perlman
(74) *Attorney, Agent, or Firm* — ScienBiziP, P.C.

(57) ABSTRACT

An image measurement device acquires a first measurement region and a second measurement region on an image, acquires distance information corresponding to the first measurement region and distance information corresponding to the second measurement region, and computes a distance between the two regions. In a case where the first measurement region is displaced on the image, the second measurement region is displaced on a contour or a plane on the image, and a distance between the first measurement region after the displacement and the second measurement region after the displacement is computed. Thereby, distance measurement is able to be performed over a wide range without a complicated operation in the image measurement device for measuring a distance between two regions by using an image.

14 Claims, 13 Drawing Sheets

(51) Int. Cl.
*H04N 13/239* (2018.01)
*E01B 35/06* (2006.01)
*G01B 11/02* (2006.01)
*E01B 35/02* (2006.01)
*G06T 7/60* (2017.01)
*G06T 7/73* (2017.01)

(52) U.S. Cl.
CPC .................. *G06T 7/60* (2013.01); *G06T 7/73* (2017.01); *H04N 13/239* (2018.05); *G06T 2200/04* (2013.01); *G06T 2207/10021* (2013.01); *G06T 2207/30252* (2013.01)

(56) References Cited

OTHER PUBLICATIONS

Official Communication issued in International Patent Application No. PCT/JP2014/061823, dated Aug. 5, 2014.

\* cited by examiner

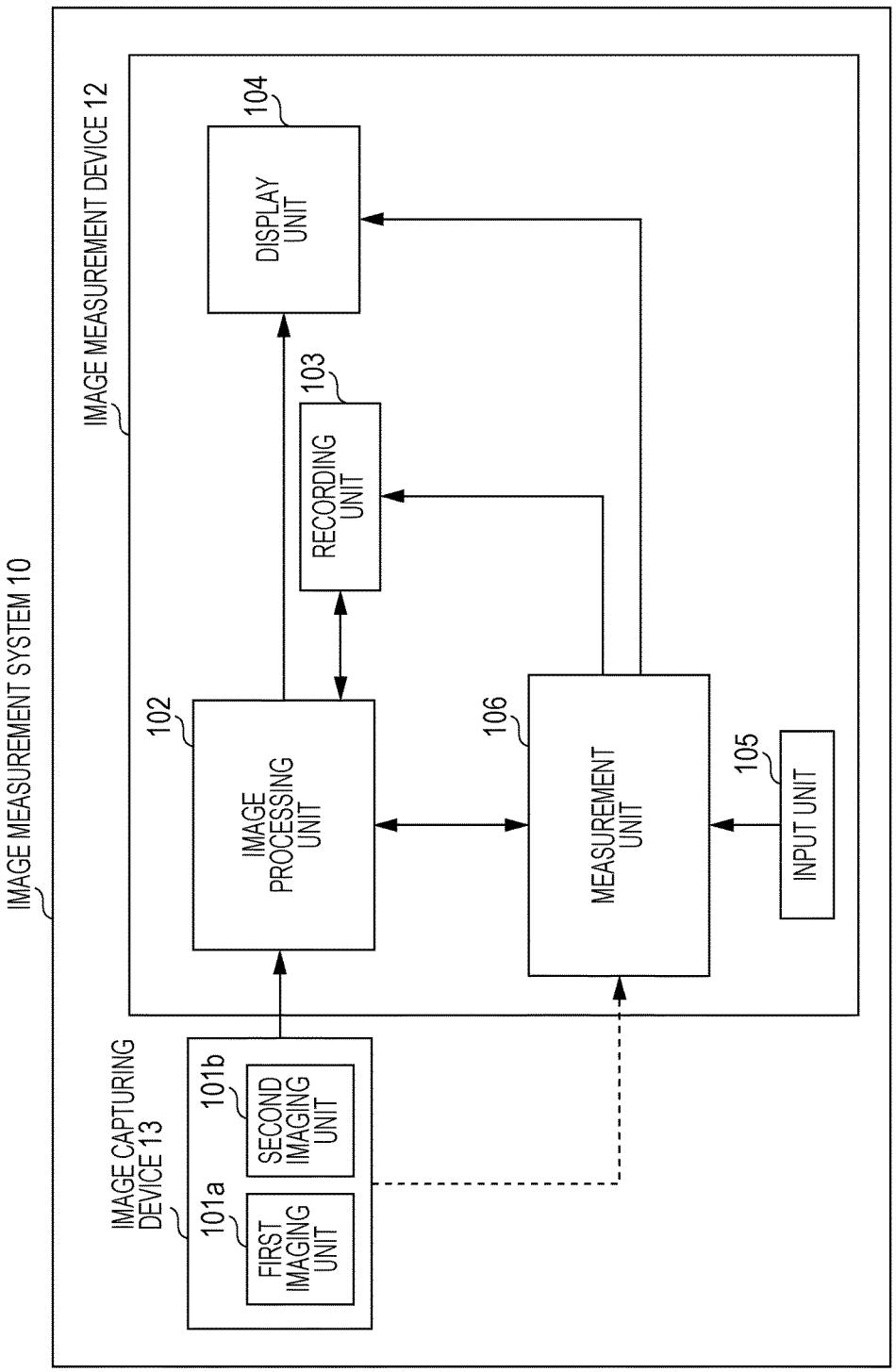

FIG. 6
(a)
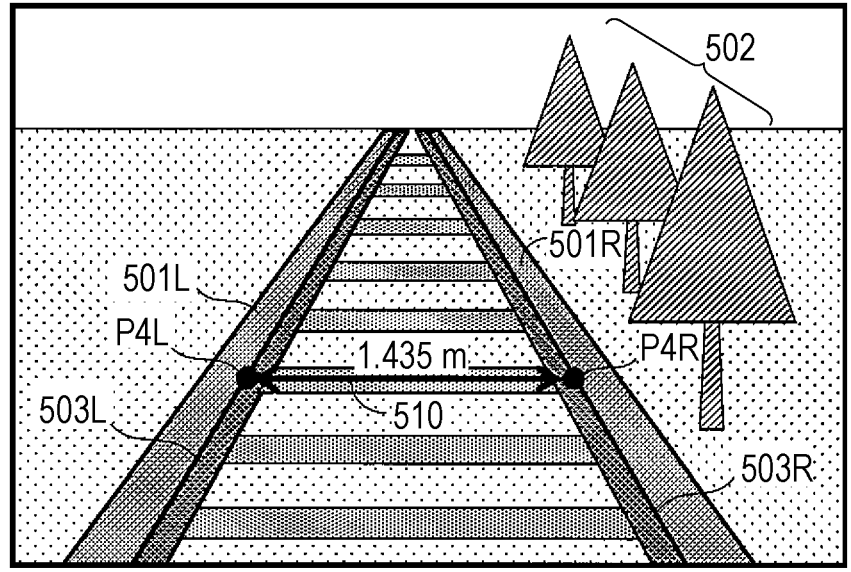
(b)
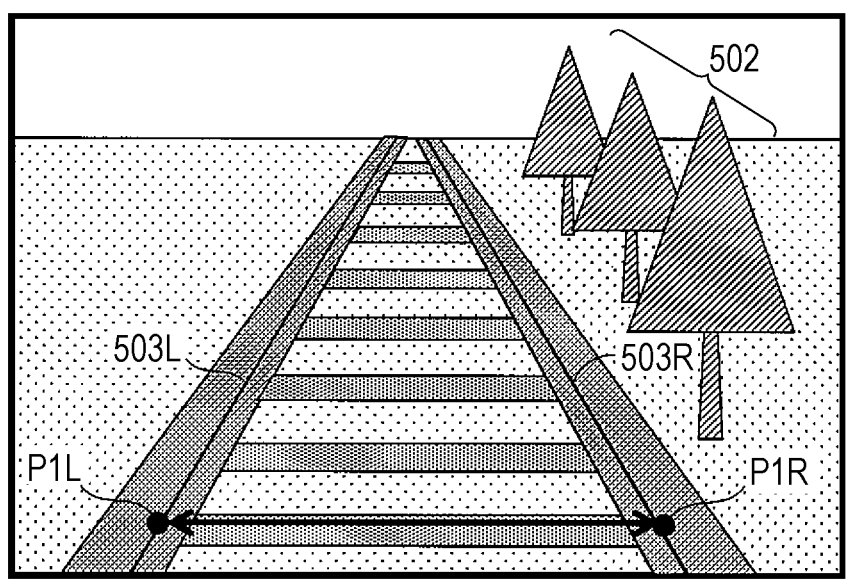

FIG. 9
(a)
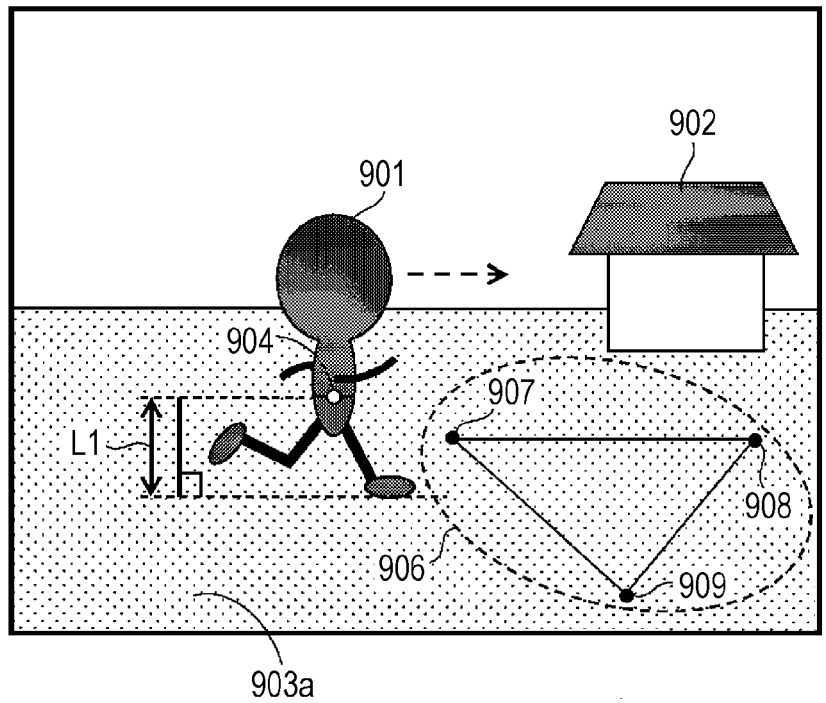
(b)
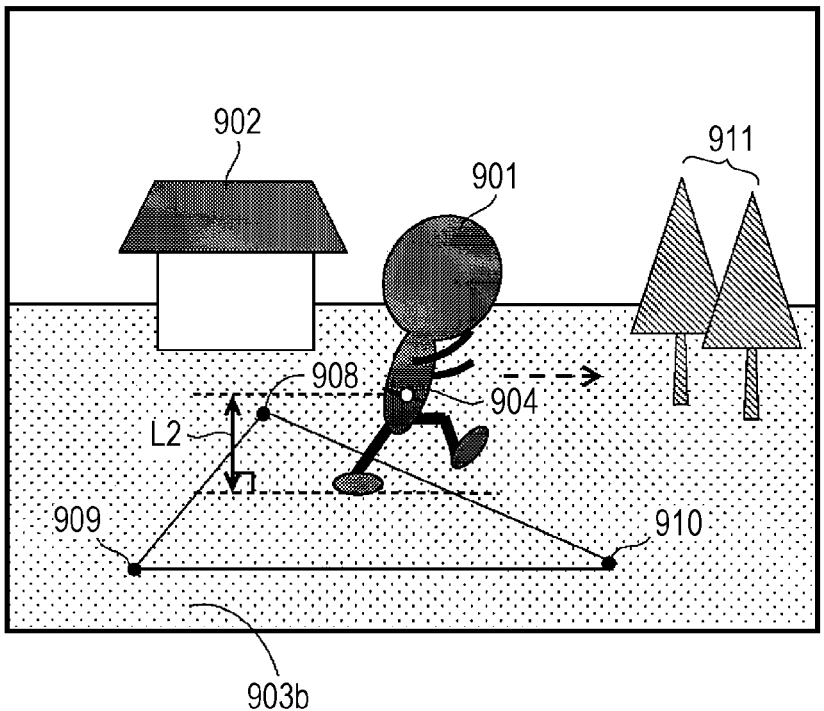

FIG. 11
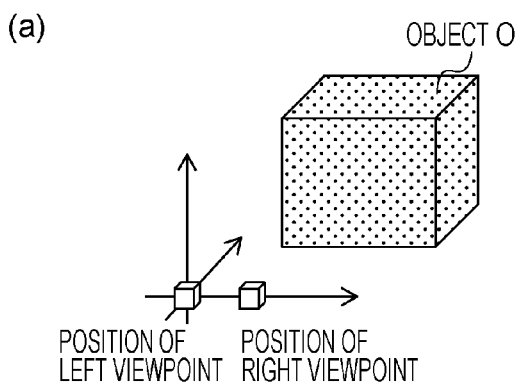
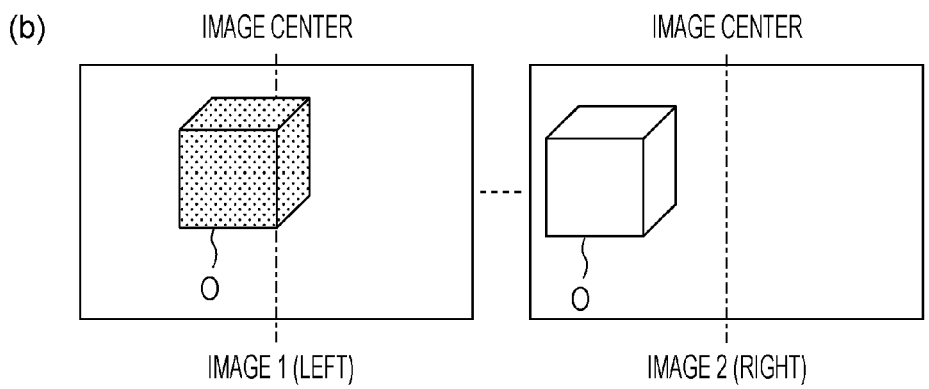
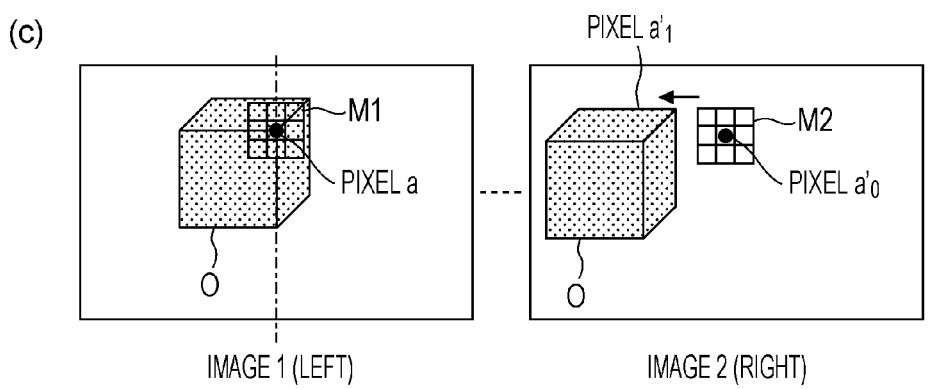

FIG. 12
(a)
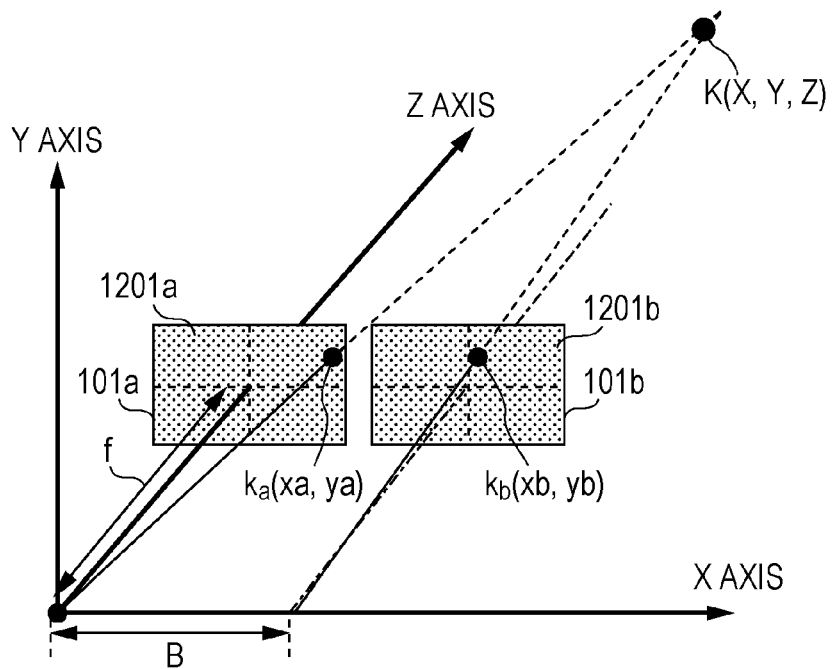
(b)
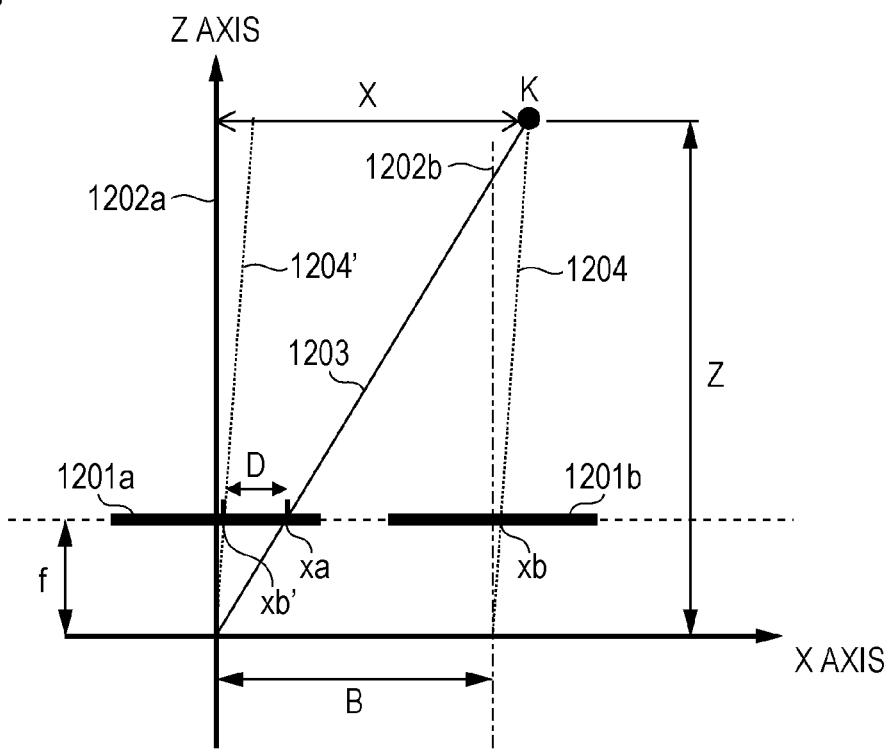

IMAGE MEASUREMENT DEVICE

TECHNICAL FIELD

The present invention relates to an image measurement device capable of easily measuring a distance between any portions of two objects by using an image capturing device having binocular disparity.

BACKGROUND ART

When it is intended to measure a distance between desired regions, a method for performing the measurement by directly pressing measurement equipment such as a ruler or a tape measure against a measurement portion is generally used. When a distance between objects over a wide range is measured or when a measurement target is moving, however, it is difficult to perform measurement directly. For example, for ensuring riding comfort and safety for a train, a distance between right and left rails (track gauge) is measured at many portions on the rails and whether the distance is within a prescribed range is checked in some cases, but the measurement portions are large in number and in area, so that a working becomes troublesome and it takes a huge amount of time to measure the whole. Further, for example, when displacement in a height of the waist of a runner, that is, a distance between a ground surface and the waist is intended to be analyzed for checking a form in sports, etc., since a measurement target is moving, the measurement is difficult to be performed directly. Thus, it is desired to measure a distance of a desired target in a non-contact manner. As one of the methods for performing measurement in a non-contact manner, a technique for performing measurement while visually checking a measurement portion by using an image has been proposed.

PTL 1 described below discloses a technique that an image capturing device provided with two imaging units is used to create a three-dimensional model of an object from a pair of images having binocular disparity and compute a length between two points designated by a user, and it becomes possible to measure an actual length between the two points designated on an image.

CITATION LIST

Patent Literature

PTL 1: Japanese Unexamined Patent Application Publication No. 2011-232330

SUMMARY OF INVENTION

Technical Problem

In the technique described in PTL 1 above, however, the three-dimensional model of the object needs to be created, so that there are problems in that the three-dimensional model is difficult to be created in the case of a measurement target which is moving with respect to a camera and that three-dimensional positions need to be computed at many points on the object, which increases a processing amount and causes a system to be enlarged. Though the distance between the two points on the created three-dimensional model is able to be measured, when measuring a distance between targets having a region such as a curved line or a plane, a user himself/herself needs to perform a working of extracting measurement points that a distance therebetween is the smallest, thus posing a problem that the working becomes troublesome. Further, a case where a distance to a target which is out of a view angle is measured and a case where a positional relation between an object and a camera is dynamically displaced and a measurement point is displaced accordingly are not considered.

The invention has been made in view of circumstances described above, and aims to measure a distance to a target having a region in a wide range, such as a curved line or a plane, by a simple operation.

Solution to Problem

According to one aspect of the invention, an image measurement device is provided. The image measurement device has a first measurement region acquisition unit for acquiring a first measurement region from an image and a second measurement region acquisition unit for acquiring a second measurement region, which is different from the first measurement region, from the image, and computes a distance between the first measurement region and the second measurement region from distance information corresponding to the first measurement region and distance information corresponding to the second measurement region, the image measurement device including: a linear region following unit or a plane region deciding unit that causes a contour or a plane on the image, at which the second measurement region is positioned, to be displaced in the second measurement region in response to an operation from an input unit that causes the first measurement region to be displaced on the image; and a distance computation unit that computes a distance between the first measurement region after the displacement and the second measurement region after the displacement, which is displaced by the linear region following unit or the plane region deciding unit.

The present description includes the content in its entirety described in the specification and/or the drawings of Japanese Patent Application No. 2013-097837 which is the base of the priority of the present application.

Advantageous Effects of Invention

According to the invention, by designating two regions on an image, a distance between the two regions is able to be obtained in a non-contact manner easily. Even when a relative position to a camera changes or a designated object is a target over a wide range, which is out of a view angle of the camera, a measurement portion is followed and automatically detected, so that an effect that a distance between desired regions is able to be measured is achieved.

BRIEF DESCRIPTION OF DRAWINGS

FIG. 1B is a functional block diagram illustrating a configuration example of an image measurement system, which is composed of the image measurement device and an image capturing device, according to the embodiment of the invention.

FIG. 6(a) and FIG. 6(b) are views illustrating photographed images when a photographing position is changed.

FIG. 9(a) is a view illustrating a photographed image at a time of measurement, and 9(b) is a view illustrating a photographed image when a photographing position is changed.

FIG. 11 illustrates a schematic view when photographing is performed from different positions and a schematic view for explaining block matching.

FIG. 12 is a view related to a three-dimensional position computed by a first or second three-dimensional measurement region acquisition unit.

DESCRIPTION OF EMBODIMENTS

First Embodiment

Embodiments of an image measurement technique according to the invention will be described below with reference to drawings.

Figure 1A:
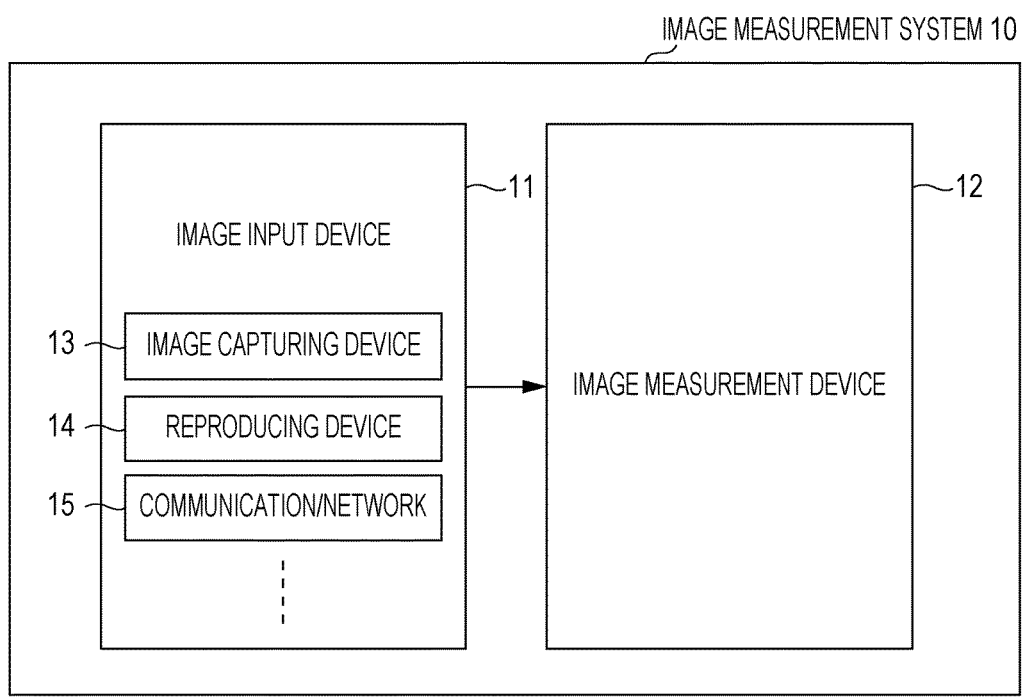
FIG. 1A is a functional block diagram illustrating a configuration example of an image measurement system provided with an image measurement device according to an embodiment of the invention.

FIG. 1A is a functional block diagram illustrating a schematic configuration example of an image measurement system provided with an image measurement device in an embodiment of the invention. An image measurement system 10 has an image input device 11 and an image measurement device 12. The image input device 11 is, for example, an image capturing device 13, a reproducing device 14, a communication/network 15, or the like, acquires image data of an object that is a measurement target, and outputs the image data to the image measurement device 12. The image measurement device 12 computes a distance between two desired regions from image data which is input. In the present embodiment, description will be given by taking an image measurement system, which is composed of the image capturing device 13 and the image measurement device 12, as an example. FIG. 1B illustrates a functional block diagram illustrating a schematic configuration example of the image measurement system. Note that, a method for inputting image date to the image measurement device 12 is not limited to that illustrated in FIG. 1B.

The image measurement system 10 in the present embodiment is composed of the image capturing device 13 and the image measurement device 12, and the image measurement device 12 has an image processing unit 102, a recording unit 103, a display unit 104, an input unit 105, and a measurement unit 106.

The image capturing device 13 has at least a first imaging unit 101a and a second imaging unit 101b that function as two imaging units, and each of the imaging units 101a and 101b has a typical configuration of an image capturing device, which is composed of a lens, an image sensor such as a CCD (Charge Coupled Device) or a CMOS (Complementary Metal Oxide Semiconductor), a control unit which controls operation thereof, a memory, and the like. The two imaging units 101a and 101b are arranged at positions mutually shifted in parallel in a right-left direction so that two images photographed at each of the imaging units 101a and 101b have disparity.

Here, a certain point on a certain object is positioned at a place shifted in a horizontal direction on each of the two images because of their different photographing positions, that is, viewpoint positions, and a shift amount thereof is referred to as disparity. In this case, as to the disparity of the images which are photographed with parallel arrangement, the disparity increases as the object is close to the image capturing device and, contrary to that, the disparity decreases as being far, so that the disparity is almost 0 when the object is positioned so far with respect to a length between the imaging units, that is, in an infinity region. The disparity at a certain distance is determined by a baseline length which is a distance between the imaging units 101a and 101b, an optical system, and parameters such as a resolution related to an image sensor. In the present embodiment, description will be given by assuming that the two imaging units 101a and 101b have equivalent characteristics (specifications) and use the same lens, image sensor and the like. When the specifications are different, with respect to one imaging unit serving as a reference, each parameter of the other imaging unit may be normalized. In this manner, captured image data which is captured by the imaging unit 101 is output to the image processing unit 102. At this time, necessary photographing information such as a baseline length and focal distance information at a time of photographing is output to a camera parameter acquisition unit 113. Note that, the camera parameter acquisition unit 113 may be configured to hold a camera parameter in advance separately and does not receive information directly from the imaging unit 101 in that case.

Note that, hereinafter, images having disparity photographed by the imaging unit 101, which are acquired in single photographing, are represented as images a and b.

The image processing unit 102 performs, for example, processing of adjusting brightness or adjusting a color of image data captured by the imaging unit 101, conversion into a data format in accordance with the display unit 104, and outputting processing and reading processing of data with the recording unit 103. Moreover, the image processing unit 102 performs processing such as outputting image data to the measurement unit 106 described below, and superposing information of a character, a mark, a graphic, or the like on the photographed images to be output based on information acquired from the measurement unit 106. In the present embodiment, it is assumed that a disparity value of the captured image data from the image capturing device 13 is not adjusted, but, for example, when an output is performed after adjusting the disparity value of the images a and b in order to adjust stereoscopic effect of a stereoscopic image, the image processing unit 102 outputs the image data to the measurement unit 106 by performing processing to return the image data before adjusting.

The recording unit 103 is composed of a hard disk, a flash memory, or the like, and performs recording of the image data output from the image processing unit 102.

The display unit 104 is a device that displays, for example, an image received from the image processing unit 102, and is composed of, for example, a liquid crystal display or the like. The display unit 104 may be integrally formed with the input unit 105 described below like a touch panel liquid crystal.

The input unit 105 is provided for inputting a command of selection or determination by a user, and for inputting, for example, by a cross-key for moving a pointer on an image or a touch panel. In the present embodiment, the input unit 105 is composed of the touch panel liquid crystal which is integrated with the display unit 104, and when a measurement region on an image is selected, it is possible to select a part which is intended to be measured or the like by touching a portion which is intended to be designated. The measurement unit 106 computes a distance between two measurement regions designated by the user.

Figure 2:
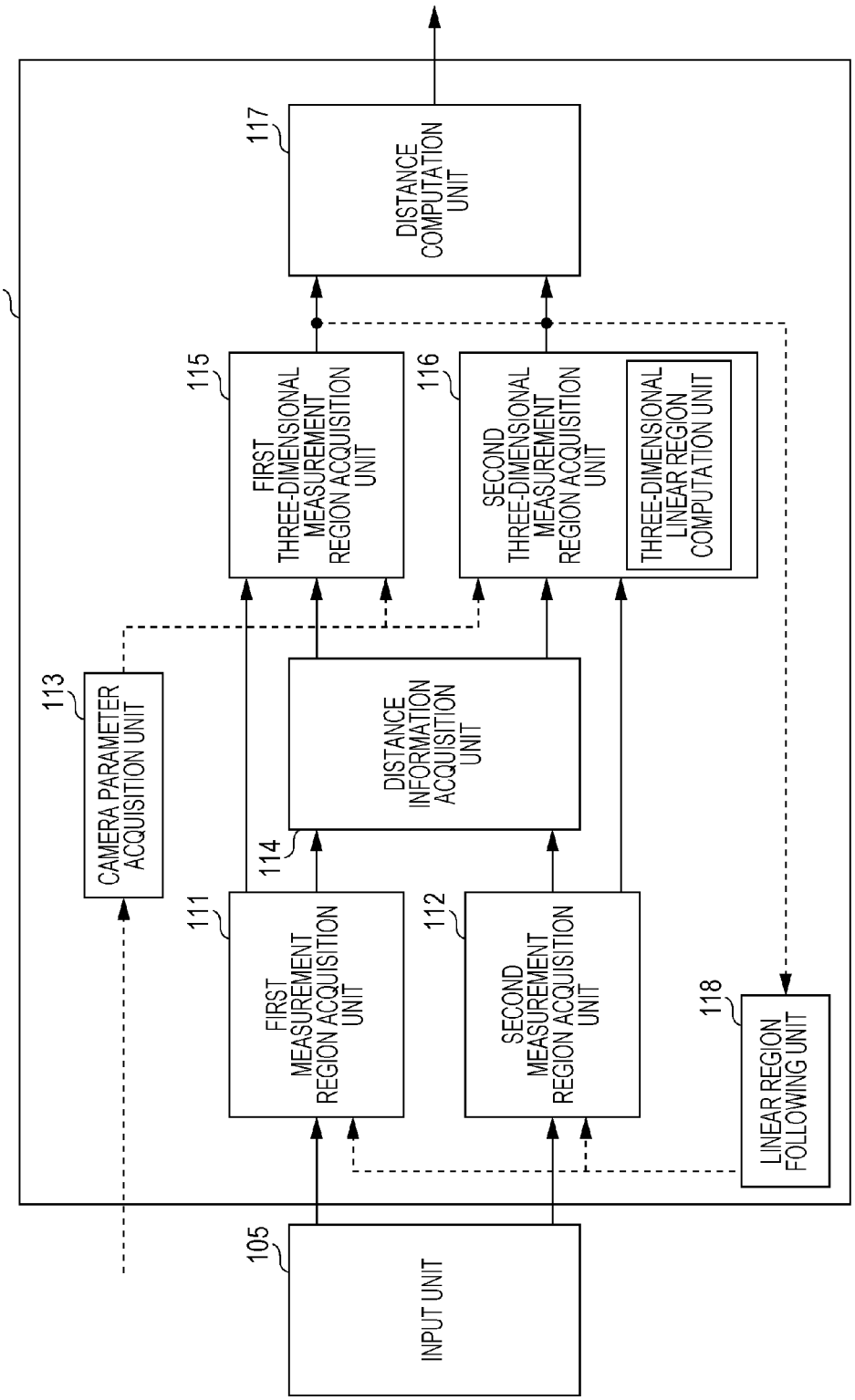
FIG. 2 is a functional block diagram illustrating a configuration example of a measurement unit of the image measurement device according to the embodiment of the invention.

FIG. 2 is a diagram illustrating a detailed configuration example of the measurement unit 106. The measurement unit 106 includes a first measurement region acquisition unit 111, a second measurement region acquisition unit 112, the camera parameter acquisition unit 113, a distance information acquisition unit 114, a first three-dimensional measurement region acquisition unit 115, a second three-dimensional measurement region acquisition unit 116, a distance computation unit 117, and a linear region following unit 118, and computes a distance between two regions, which is intended to be measured by the user, from the captured image data. A measurement result which is computed is able to be displayed on the display unit 104.

Figure 3:
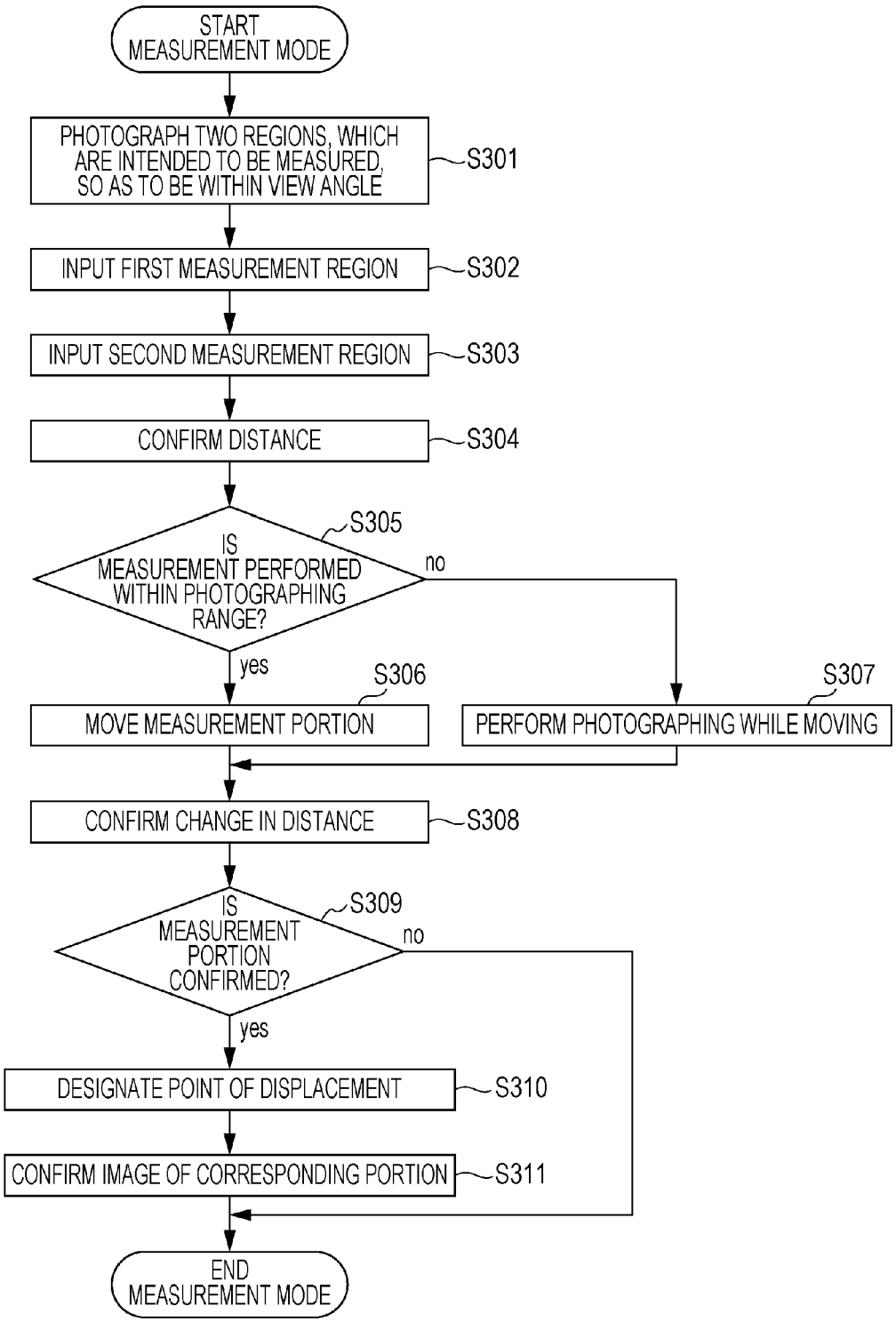
FIG. 3 is a diagram illustrating a measurement method from photographing to confirmation of a measurement result when a region which is intended to be measured is measured by using the image measurement device of the present embodiment.
Figure 4:
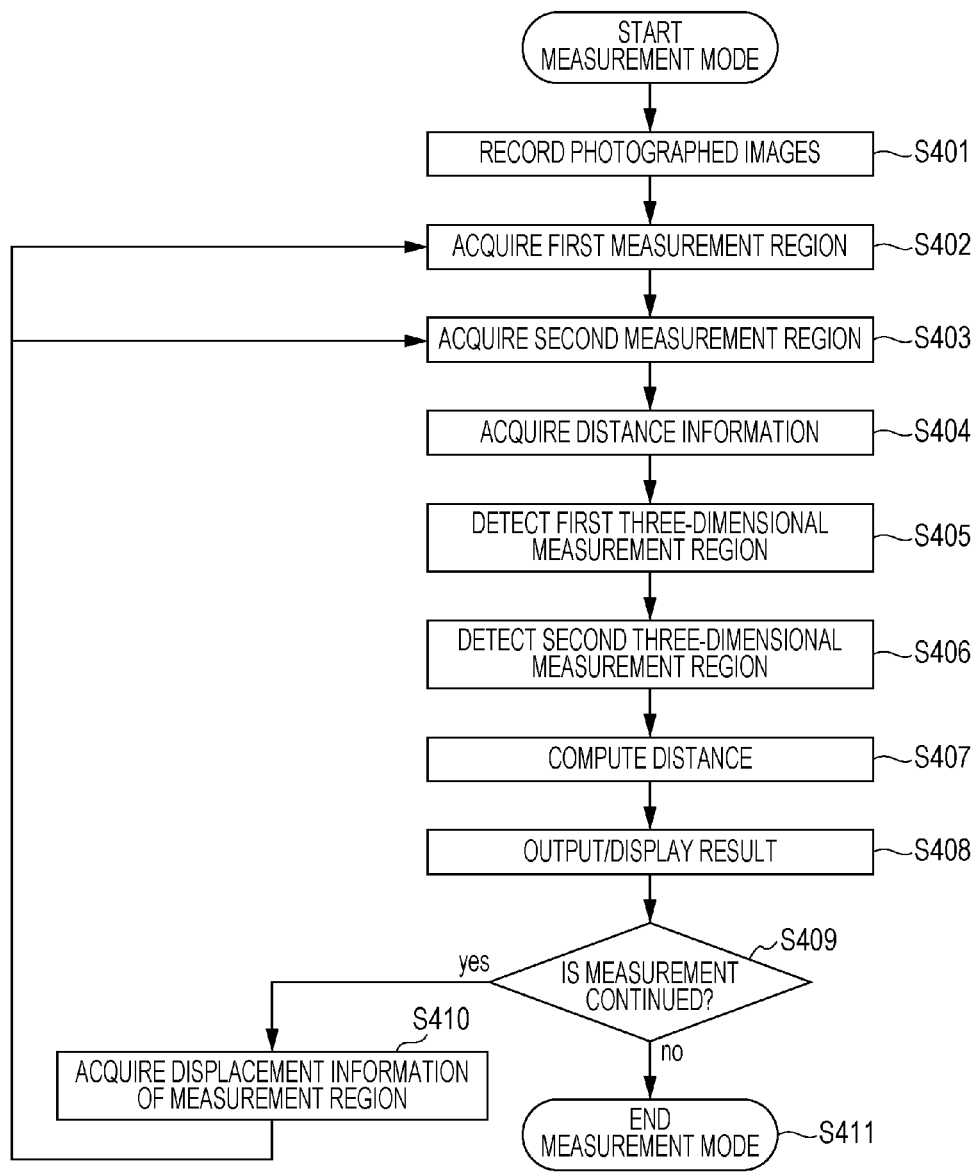
FIG. 4 is a flowchart illustrating a flow of processing executed in each component of the image measurement device of the present embodiment in a measurement operation in FIG. 2 and illustrating an outline of processing from acquisition of photographed images to computation of measurement regions.

FIG. 3 illustrates operation procedure in measurement, and is a flowchart illustrating a flow from photographing of a measurement target to confirmation of a measurement result. FIG. 4 is a flowchart illustrating a flow of processing at a time of measurement, which illustrates a flow of processing executed in each component of the image measurement device 12 of the present embodiment and represents an outline of processing from acquisition of photographed images to input of measurement regions and computation of a distance between two regions.

First, measurement procedure will be described by using FIG. 3. Here, description will be given with a case example of, when a track gauge which is a distance between two rails of a railway as illustrated in FIG. 5(a) is measured over a wide range, performing measurement by the present image capturing device on the railway.

When a start of a measurement mode of the image measurement system 10 is detected, regions of a measurement target are photographed by the image capturing device 13 (S301). An image obtained by photographing the measurement target at this time is illustrated in FIG. 5(a). In FIG. 5(a), two rails 501L and 501R and a different object 502 positioned forward are photographed. Next, two measurement regions are designated to designate a portion for measuring a distance. Here, for measuring a distance inside the two rails 501L and 501R, a measurement point P1L on an edge 503L of the rail 501L is designated in designation of a first measurement region (S302). For designating a measurement region, selection is able to be performed by designating a region on an image which is displayed. For example, when it is desired to designate a point on the edge 503L, it is desirable that the designation is able to be performed by a simple method that, for example, by selecting an edge of a measurement region by tracing the edge 503L on the image and then designating a point on the edge 503L, the first measurement point P1L is able to be designated. This is because not only it is easily obtained intuitively but also there is an effect that accuracy of detecting a desired edge is enhanced. A plurality of edges are usually detected in an image, but by performing selection by tracing an edge, a direction of an edge which is intended to be selected by the user is able to be judged. Therefore, even when another edge which is not a measurement target is detected near the selected region, an unnecessary edge is able to be discriminated from the edge direction which is input, thus accuracy of detection being enhanced. It is more effective particularly when a display screen is small. This is because, for example, when an input is performed with a finger on a touch panel, as a screen becomes small, a region which is designated becomes wide and an edge not intended is more likely to be included.

Next, a second measurement region is designated (S303). In the designation of the second measurement region, an edge 503R on the target rail 501R is designated. Similarly, by designating the edge 503R by tracing a vicinity of the edge on the image, it is possible to designate the edge easily. When the first measurement region and the second measurement region are designated, a distance in a three-dimensional space (real space) between the two regions is measured and a measurement portion and a numerical value of the distance are displayed on a screen so that the measurement portion and a measurement value thereof are able to be confirmed (S304). At this time, a point P1R on the edge 503R, which takes a shortest distance to the measurement point P1L in the three-dimensional space, is automatically detected, and a computation value 504 of the distance between the measurement point P1L and the measurement point P1R is displayed. FIG. 5(b) illustrates a cross section in a direction vertical to the rails and having the two points P1L and the P1R, in which a distance 504 between two points (P1L and P1R) inside and upward of the two rails is measured.

Next, the measurement portion needs to be moved when the track gauge is measured over a wide range, and description will be given here with two methods of a case where the measurement portion is moved on the image (S306) and a case where the measurement is performed while moving a photographing position (S307).

Since the distance between the two points is able to be measured while moving the measurement portion on the photographed image, the measurement is able to be performed in a region of a wide range as long as being within a photographing range without moving the image capturing device (yes at S305). When the measurement portion is moved on the photographed image, only by moving the first measurement point along the edge 503L, a distance to the edge 503R is computed. FIG. 5(c) illustrates a measurement result when a position of PL1 is changed to a position of the different point P2L on the edge 503L on the image from FIG. 5(a). When the first measurement point is changed from P1L to the position of P2L, a new second measurement point P2R which takes a shortest distance in the three-dimensional space to the measurement point P2L on the edge 503R is detected and a distance between P2L and P2R is computed. Thus, only by changing the position of the first measurement point, a distance to a desired curved line (edge 503R) is able to be measured based on the position of the measurement point which has been changed. Here, for example, when displacement of the track gauge in a section from P1L to P2L is intended to be checked, by moving P1L to the position of P2L, information about the change in the distance between the two regions is able to be acquired (S306). At this time, the distance measurement is performed along with the movement from P1L to P2L while the measurement point is changed as well, and distance data thereof is recorded. Accordingly, only by moving the first measurement point in this manner, the distance measurement for the section of movement is able to be performed easily and information about the change is able to be confirmed (S308).

At this time, degree of change is able to be confirmed easily by displaying as a graph a result of distance (track gauge) displacement in a range in which the measurement is performed, for example, as illustrated in FIG. 5(d). When it is not necessary to confirm nor continuously measure the measurement portion, the measurement mode ends (no at S309). As illustrated in FIG. 5(d), it is assumed that the distance of the track gauge needs to be fall between reference values 507 and 508 and a measurement value 509 exceeds the range. When a measurement portion of the measurement value 509 is intended to be confirmed (yes at S309), by selecting the portion of the measurement value 509 (S310), the portion the measurement value of which is obtained is displayed on the photographed image and the measurement portion is able to be confirmed (S311). This is because it is possible to easily associate the measurement value with coordinates on the image. By moving the first measurement point on the image in this manner, the associated measurement point is automatically detected from the second measurement region, so that the distance between the two regions is able to be easily measured over a wide range. Further, from acquired measurement values, the portions at which they are computed are able to be confirmed with the image immediately, so that the measurement values and the measurement portions are easily managed.

In the above, while a measurement position is being changed in the image by fixing the photographing position, the change in the measurement value is confirmed, but it is necessary to perform the measurement while moving in order to measure the change in the distance between the two regions over a wide range which exceeds a view angle. At this time, after a measurement region is designated on the initial photographed image illustrated in FIG. 5(a), the image capturing device may be moved while photographing (S307).

In the present embodiment, description will be given with a case where measurement is performed while moving frontward along the rails. Measurement values are computed over a wide range by moving the measurement point P1L in the image in the above, and in this case, by changing the position of P1L in accordance with movement of the image capturing device, a distance in a wide range and displacement thereof are measured. FIG. 6(a) illustrates a photographed image when moving frontward from the photographing position of FIG. 5(a). The same symbol indicates the same object. A measurement point P4L on the inside edge 503L of the rail 501L is acquired, a second measurement point P4R on the edge 503R is detected correspondingly, and a distance 510 between the two points is computed. In this case, by fixing pixel positions of P1L and P4L in a vertical direction of the image as the same positions and following the position of the edge 503L, a pixel position in a horizontal direction is corrected so as to be at the position on the edge 503L and the position of the first measurement point is automatically set. As the photographing position moves frontward, for the first measurement point as well, the position of the first measurement point is changed in a direction of moving with the position on the edge kept, and the track gauge of the rails is measured for each position. In this manner, by setting the measurement point in the first measurement region by considering a movement amount and a direction of the image capturing device, measurement in a wide range becomes possible.

Figure 5:
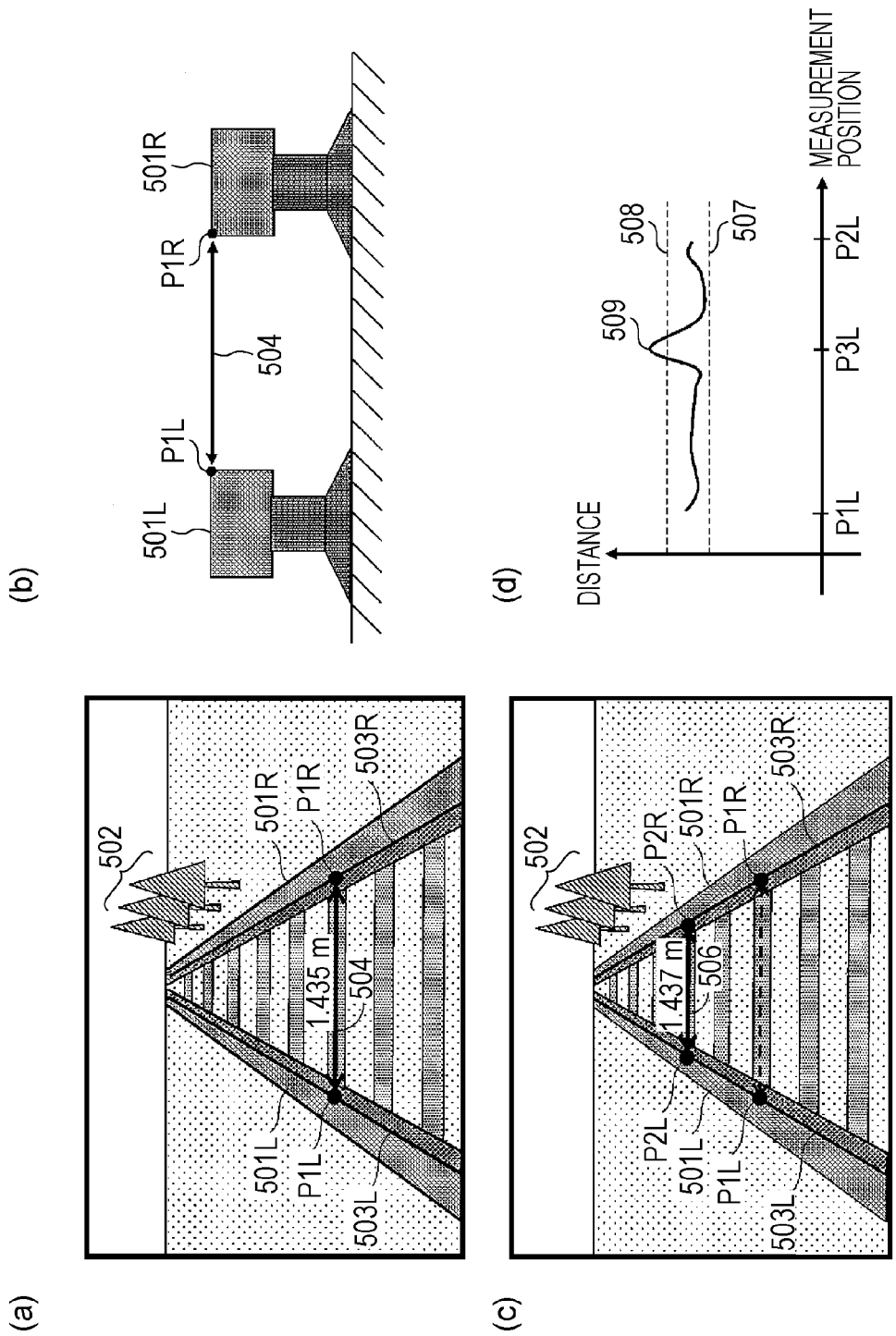
FIG. 5(a) is a view illustrating a photographed image at a time of measurement, 5(b) is a view illustrating a cross section of a measurement portion, 5(c) is a view illustrating an example that a measurement position is changed, and 5(d) is an example indicating displacement in a result of distance measurement.

Since distance data which is measured is recorded similarly, measurement values of the track gauge in a range from P1L to P4L are able to be acquired, and as illustrated in FIG. 5 (d), the change and a corresponding measurement portion are able to be confirmed easily (S308).

In this manner, only with photographing and simple designation of measurement regions, measurement of a distance between two regions becomes possible over a wide range. Further, since association of measurement values and image data is able to be managed easily, when it is intended to confirm of what portion a measurement value is, a corresponding photographed image is able to be extracted easily, and further, a detailed measurement portion is able to be recognized easily by superposing and displaying on an actual photographed image.

The example of processing for performing photographing and measurement after designating measurement regions is described in the present embodiment, but without limitation thereto, photographing may be performed first and then processing for designating a distance between two desired regions may be performed. By recording image data, it is possible to perform confirmation even later, so that there is an effect that measurement in the case of measurement omission or at a remote place is also allowed.

Next, a flow of processing of each component will be described by using FIG. 4 along the aforementioned operation procedure. A measurement mode starts, a measurement target is photographed, and photographed images are recorded (S401). At this time, images a and b having disparity, which are acquired by the imaging unit 101, are given to the image processing unit 102, subjected to adjustment of brightness and conversion into various data formats of a still image file such as JPEG and a moving image file such as MPEG, etc., and recorded in the recording unit 103. The photographed images are displayed on the display unit 104. Here, the photographed image by the imaging unit 101a which is arranged on a left side is set as a reference image and the reference image is to be displayed on the display unit 104. Next, the user designates a portion, which is intended to be measured, from the displayed image by the input unit 105, and acquires measurement region information on the photographed images by the first image measurement region acquisition unit 111 and the second measurement region acquisition unit 112 (S402, S403). The present embodiment takes an example that the display unit 104 is composed of, for example, a touch panel liquid crystal of an electrostatic capacitance type and is formed integrally with the input unit 105, but the method is not limited thereto as long as being a method for selecting a desired region which is intended to be measured while visually recognizing the image, such as selecting a region with a key which moves a cursor displayed on the image.

Acquisition of the first measurement region will be described. In the first measurement region acquisition unit 111, edge detection processing is performed on the image a, an edge which is in a closest region and direction from detected edges by referring to edge region information which is input is selected as the first measurement region. An input of the measurement unit 106 is performed by means of inputting by tracing the edge direction, and by detecting a input moving direction, the edge direction which is intended to be measured by the user is identified. Using input coordinates and the input direction by the inputting means makes it possible to extract the edge which is intended to be selected by the user more accurately.

After the edge is selected, it is desirable that the user is notified by superposing and displaying the extracted edge on the image, thereby allowing confirmation as to whether the edge region is an edge region intended to be selected by the user. In addition, it is desirable that when the edge is different from one which is intended to be selected by the user, a caution, which is to be notified, is displayed on a surface so as to allow re-selection. This is because, as described below, measurement processing of a distance in a wide range is performed later based on the measurement region which is set initially while automatically following the region, so that target measurement is performed reliably by confirming in advance. As a method for detecting edges in an image, there are various methods such as Sobel, Canny and Laplacian, but here the edge detection method is not limited particularly as long as being able to detect an edge region which has a feature on the same object.

Next, a measurement point on the selected edge is further input on a screen, coordinate information on the image is acquired, and a measurement point in the first measurement region is acquired (S402).

When selecting the edge and the measurement point on the edge, it is desirable that, for example, even when the user designates a position which is slightly shifted from the edge 503L of FIG. 5, the intended position is selected by automatically correcting the position such as by allowing the closest edge 503L to be selected or a point on the corresponding edge to be selected. When a display screen size is small, the photographed image reduced in size is displayed, and even when designation is performed in a unit of one pixel on the display screen, a region of some pixels may be designated on captured image data. Moreover, there is a case where designation in a minute region is difficult to be performed, such as a case where designation is performed by using a finger on a touch panel. In such a case, by correcting the position automatically as described above, the target measurement portion is able to be selected easily. Furthermore, it is desirable that the user may confirm whether the position of the acquired measurement point is at the portion which is intended to be measured by superposing and displaying the position on the screen.

Next, an edge that is the second measurement region is designated on the image, and coordination information thereof is acquired by the second measurement region acquisition unit (S403). In this case also, as described in the designation of the first measurement region, in order to designate the target measurement region accurately, it is desirable that position information of the edge close to the input edge direction and the designated region is extracted and a coordinate position is corrected.

The edge and the point which are proximate to the designated region are selected in the present embodiment, but without limitation thereto, for example, edges which are detected in advance may be superposed and displayed on the screen to be selected by the user therefrom.

The coordinate information of the first measurement region and the coordinate information of the second measurement region which are acquired are output to the distance information acquisition unit 114, and distance information for the selected measurement regions is acquired (S404).

In the distance information acquisition unit 114, distance information in a three-dimensional space (in a real space) for the designated measurement regions is acquired. Here, description will be given with an example that a disparity value for the measurement regions is computed from the two images having disparity, which is set as the distance information. In the distance information acquisition unit 114, corresponding points at coordinates of measurement portions A and B on the reference image a which is input are obtained from the image b of the imaging unit 101b and the disparity value is computed. The corresponding points indicate the same feature points on the same object which appears in the image a and the image b, and in this case, the images a and b are images photographed by the imaging units arranged at different positions, so that the aforementioned same feature points are arranged at different coordinate positions on the two images. For example, when the two imaging units are arranged in a horizontal direction, the corresponding points are detected at positions shifted in the horizontal direction.

For the computation of the disparity value, for example, a block matching method is able to be used. In computation of a disparity value by the block matching method, positions of feature points of the same object are detected in two images by degree of similarity in a unit of a block and a shifting amount therebetween (disparity amount) is detected. Common points between the two images related to the feature points are called corresponding points as described above. For searching for corresponding points, SAD (Sum of Absolute Difference) is uses as an evaluation function. In SAD, windows are set with pixels of interest as a center in each of images 1 and 2, and differences of luminance of respective pixels between the set windows are obtained, and a sum of the differences of the luminance obtained between the respective pixels is computed. Similar processing is performed while changing a pixel of interest on the image 2 side and a pixel of interest which has the smallest value is set as the corresponding point.

FIG. 11(a) illustrates a schematic view when an object O is photographed from positions with different viewpoints in the horizontal direction. An image photographed from a left viewpoint is the image 1 and an image photographed from a right viewpoint is like the image 2. The images photographed at this time are illustrated in FIG. 11(b). It is found from FIG. 11(b) that a position of the object O exists at different positions in the respective images since the position of the viewpoint is different.

By using FIG. 11(c) and FIG. 11(d), description will be given for block matching when one vertex on the object O is set as a feature point in a case of computing a disparity value with the image 1 as a reference. When the feature point exists at a pixel a on the image 1, a window M1 having a size of 3×3 with the pixel a as a center is set. Then, a pixel a'$_0$ which is at the same position as that of the pixel a in the image 2 is set as a search start point, and a window M2 of 3×3 is set. Next, differences of luminance of respective pixels between the set windows are obtained, and a sum of the differences of the luminance obtained between the respective pixels is computed. For example, like FIG. 11(d), when values of pixels of the set windows are respectively X1 to X9 and X'1 to X'9,

[Expression 1]   Equation (1)

$$SAD = \sum_{i=0}^{3\times 3-1}(|x_i - x'_i|).$$

By performing computation as Equation (1), a value of SAD is obtained. The images having disparity, which are photographed by the imaging units arranged in parallel, have disparity of 0 at infinity, and the disparity increases as the object is close to the imaging units. At this time, when the image 2 is obtained from the right viewpoint with the image 1 as a reference, the feature point on the image 2 moves to a left side. Thus, a pixel of interest is changed to a left direction from the pixel $a'_0$ with a search direction as the left side, SAD values described above are obtained sequentially, and a pixel of interest which has the smallest value among the obtained SAD values is set as the corresponding point. In this case, when a pixel $a'_1$ on the image 2, which is the corresponding point, has a result of the smallest value, this pixel is set as the corresponding point.

By performing such processing for a pixel whose corresponding point is intended to be obtained, a disparity value for the pixel is able to be acquired. In the present embodiment, the disparity value is computed by setting the image 1 and the image 2 to have the size of 1920×1080 and the window size of 25×25 with the pixel of interest as a center. Note that, the aforementioned image and block sizes are set here, but without limitation thereto, the setting may be performed appropriately in consideration of accuracy and a processing amount. Moreover, the disparity value is obtained by block matching using SAD in the present embodiment, but may be obtained by using other evaluation functions.

There is no limitation to a matching method based on regions like block matching, and other methods for detecting a feature point may be used. As other method for computing disparity, a point or a region which has a considerable change of a tint value on an image is extracted, processing for prescribing a feature amount is performed for the point or the region, and degree of similarity is identified. An example of a method for extracting a feature point and identifying degree of similarity thereof includes a feature amount detection method using SIFT (Scale-Invariant Feature Transform). According to SIFT, a periphery of a feature point is divided into blocks of some pixels and a gradient histogram in eight directions is obtained for each of the blocks to indicate with a 128-dimensional feature vector. Further, as other feature amount detection, there are also methods such as SURF (Speeded-Up Robust Features), and GLOH (Gradient Location-Orientation Histogram). The disparity value has a relation relative to a distance from a photographing position, and the disparity value increases as the distance is short, the disparity value decreases as the distance is long, and it becomes 0 at infinity. Therefore, the disparity value is able to be handled with as distance information.

Next, acquired distance information in each of the measurement regions is output to the corresponding first three-dimensional measurement region acquisition unit 115 or the second three-dimensional measurement region acquisition unit 116. In the first three-dimensional measurement region acquisition unit 115, three-dimensional position coordinates of the measurement point with the imaging unit 101 as a reference are computed (S405).

Here, since a center of the reference image is set as an origin, an origin of the aforementioned three-dimensional coordinates is an optical center of the first imaging unit 101a. The three-dimensional coordinates acquired by the first three-dimensional measurement region acquisition unit 115 are output to the distance computation unit 117.

The first three-dimensional measurement region acquisition unit 115 computes actual three-dimensional position information of each point based on the distance information of each point, which is input, and information input from the camera parameter acquisition unit 113. Here, the information input by the camera parameter acquisition unit 113 indicates an external camera parameter and an internal camera parameter of the imaging unit 101. The camera parameter acquisition unit 113 acquires such parameters from the imaging unit 101 and holds them in a storage unit such as a database. The storage unit stores the distance information computed by the distance computation unit in association with displacement. The distance information may be stored in association with an operation time.

Here, the external camera parameter of the imaging unit is information indicating what arrangement the imaging units, which have photographed the two images, have, and examples thereof include a baseline length which is a distance between the two imaging units 101a and 101b and a convergence angle indicating a relative angle of optical axes between the imaging units. Further, the internal camera parameter is focal distance information of the imaging unit in photographing, and information of a pixel pitch in image sensors, etc. The camera parameter acquisition unit 113 outputs such parameter information to the first three-dimensional measurement region acquisition unit 115 and the second three-dimensional measurement region acquisition unit 116.

The first three-dimensional measurement region acquisition unit 115 computes actual three-dimensional position information corresponding to the input coordinate information. At each photographing position, the three-dimensional position here is a coordinate position in a real space with the optical center of the imaging unit which has photographed the reference image at a time of computing the disparity value as a reference, and represents a distance from the image capturing device to the object and positions in horizontal and vertical directions.

The three-dimensional position which is computed by the first three-dimensional measurement region acquisition unit 115 will be described by using FIGS. 12(a) and (b). FIG. 12(a) conceptually illustrates a relation of arrangement between a three-dimensional space formed by an X axis, a Y axis, and a Z axis in the figure and each of the imaging units, in which an optical axis of the imaging unit 101a that is a reference matches the Z axis. Moreover, it is assumed that the imaging unit 101b is arranged at a position moved in parallel by a baseline length B with respect to the imaging unit 101a. At this time, when a focal distance of the imaging unit is set as a focal distance f, sensor planes 1201a and 1201b of the two imaging units are arranged at a plane position with Z=f.

Here, when coordinates of a point K on an object which is positioned in the three-dimensional space is set as (X, Y, Z), the point K is projected on the two sensor planes 1201a and 1201b, and projected points on the sensor planes are set as ka and kb, respectively. The coordinates of K projected on each of the sensor planes 1201a and 1201b are able to be indicated in a unit of a pixel, and, for example, when upper left of the reference image is set as an origin, coordinates of ka and kb are (xa, ya) and (xb, yb), respectively.

In addition, FIG. 12(b) illustrates a view when FIG. 12(a) is viewed from a Y-axis direction. An optical axis 1202a of the imaging unit 101a in FIG. 12(b) matches the Z axis and is parallel to an optical axis 1202b of the imaging unit 101b. On the sensor plane 1201a, the point K is projected at a coordinate xa on an intersection with a straight line 1203 which connects the origin of the three-dimensional coordinates and the point K. Similarly, on the sensor plane 1201b as well, the point K is projected at a position of a coordinate xb on an intersection with a straight line 1204. Disparity D is a difference between projection positions of the same point K, and thus able to be represented as D=|xa−xb|. It may be said that the position of xb is virtually a difference from an intersection xb' when the straight line 1204 is positioned so as to pass through the origin, on the sensor plane 1201a.

Here, the point K (X, Y, Z) is obtained. Coordinates ka' when the coordinates ka on the image are represented with the center of the image as an origin are set as (x', y'). At this time, by using the disparity D for the point K, the focal distance f, the baseline length B at a time of photographing, and a pixel pitch P of a sensor, the distance Z to the point K in the real space is able to be represented as follows.

$$Z=(B \times f)/(D \times P)$$

Since a size per pixel of the sensor is able to be indicated as Z*P/f on a plane with the distance Z, X and Y of the three-dimensional position information (X, Y, Z) with the center of the reference image as a reference is able to be represented as follows.

$$X = x' \times B/D$$

$$Y = y' \times B/D$$

The three-dimensional position information in the actual space of the measurement point is able to be obtained as described above.

In this manner, the three-dimensional position information in the real space of the measurement point P1L on the edge 503L is obtained.

Similarly in the second three-dimensional measurement region acquisition unit 116 as well, three-dimensional position coordinates in the real space for a point on the edge 503R are obtained from second measurement region information and the disparity value which are input (S406). Here, whether to be a straight line or a curved line is decided by a three-dimensional linear region computation unit in the second three-dimensional measurement region acquisition unit 116, and when the second measurement region is a straight line, two points which are on the straight line are extracted, and when the second measurement region is formed of a curved line or the like and is not a straight line, three-dimensional position information of three or more points on the edge is computed. In the case of a curved line, depending on a curvature and a shape thereof, an interval and the number of computation points are controlled. When only a few points are extracted in the case of a complex shape, a shift from an actual edge position is caused and therefore a measurement error becomes large, so that the number of points to be extracted needs to be increased.

Next, the three-dimensional coordinate information of the first measurement region and the three-dimensional coordinate information of the second measurement region, which are computed, are input to the distance computation unit 117, and a distance in the three-dimensional space between the first measurement region and the second measurement region is computed (S407). When the second measurement region is a straight line, a three-dimensional linear equation is able to be obtained from three-dimensional coordinates of two points on the straight line, and a shortest distance between the three-dimensional coordinates of the first measurement point and the obtained three-dimensional linear equation of the second measurement region, and the three-dimensional coordinates of the second measurement point are computed. When the second measurement region is not a straight line, distances to a plurality of points in the second measurement region are computed and compared, and three-dimensional coordinates at which a shortest distance is obtained and a distance value thereof are output as measurement values. For example, when the three-dimensional coordinates of the first measurement point are A (Xa, Ya, Za) and three-dimensional coordinates of a certain point in the second measurement region are B (Xb, Yb, Zb), a distance L between the two points A and B is able to be computed as follows.

$$L = \sqrt{(|Xa-Xb'|^2 + |Yb-Yb'|^2 + |Za-Zb'|^2)}$$

By execution with the coordinates of the point B at a plurality of coordinates in the second measurement region, which are input, distances between the first measurement point and the respective points in the second measurement region are obtained, so that three-dimensional coordinates B which have a shortest distance L among them is set as a second measurement point. The computed distance is output to the display unit 104 and the distance and the measurement point are displayed (S408).

The second measurement point is computed so that the distance between the first measurement point and the second measurement region is the shortest in the present embodiment, but without limitation thereto, for example, a distance in a direction which passes through the first measurement point and is vertical to the edge 503L that is the first measurement region may be obtained. In this case, the distance between the two measurement points is computed by setting an intersection between a plane which passes through the first measurement point P1L and is vertical to the edge 503L and the edge 503R that is the second measurement region as the second measurement point P1R. For example, when it is intended to continuously detect a distance in the same direction with respect to the first measurement region, a measurement method by designating an angle is easily handled.

The linear region following unit 118 follows an edge position of a measurement target and detects a position of the same edge from an image. As described above, when it is intended to move a measurement portion in a photographed image to acquire distance information in a range thereof (yes at S409), a measurement position is corrected so as to be at a point on the same edge as an edge which is set initially in accordance with designated coordinates after the movement (S410). Here, for judging whether to be the same edge, continuity of the edge is decided and it is regarded as being the same in the case of having continuous edge components. When the measurement position is changed in the photographed image without moving, an edge which is selected first is set as the continuous edge. Here, many edges may be detected on the image in some cases, and it is necessary to distinguish an intended edge from other edges accurately in the middle of displacement of a measurement point. For example, when an edge of a background region is mixed, it is difficult to perform decision only with a two-dimensional image. Therefore, when the measurement point is displaced, if a plurality of edge components are detected in the same region, an edge which is spatially close to the intended edge is extracted based on the three-dimensional information acquired from the first three-dimensional measurement region acquisition unit 115 and the second three-dimensional measurement region acquisition unit 116 and judged as the continuous edge. In this manner, by using not only edge information of the photographed image but also the three-dimensional position information, an edge which is not a measurement target is separated to acquire a target edge position accurately.

In addition, when measurement is performed while moving the photographing position, a position of an edge is displaced among respective frames, so that edge detection is performed for each frame and a movement amount thereof is detected to correct a position of the measurement point so as to be a point on the same edge. At this time, when an edge which is common among the respective frames exists, a moving direction and a shift amount of the edge position are detected. When a region which was not photographed in a previous frame is appeared due to the movement of the photographing position, an edge which is close to the edge position of the measurement target is detected as the continuous edge in an image region on the moving direction side. Further, when a plurality of edges are detected and it is difficult to make discrimination based on a two-dimensional image, similarly, an edge which is spatially close is detected based on the three-dimensional information and set as the continuous edge.

The corrected measurement position information is input to the first measurement region acquisition unit 111 and the second measurement region acquisition unit 112 and distance computation processing is executed.

In this manner, the distance information which is measured over a wide range is saved in the recording unit 103 and displacement information thereof is able to be confirmed on the display unit. Since associated relations among the image, the measurement portion, and the measured distance are able to be managed easily, a measurement result according to a purpose of the user is able to be displayed.

For example, by recording a measured distance and a measurement position thereof and displaying a relation between the measurement portion in a real space and the measurement value as illustrated in FIG. 5(*d*) as a graph as described above, general tendency of the displacement is able to be obtained easily. Further, a measurement allowable value or the like may be set in advance, and when it is intended to know only when a distance exceeding the value is computed, by displaying only the corresponding distance and image data thereof, it is possible to perform management easily as to at which portion a problem is caused.

Moreover, when measurement is performed by photographing a moving image while moving, by recording from which frame a measurement value is computed, the user does not need to search for a target image from huge amount of image data by himself/herself by extracting and presenting image data of a corresponding frame.

In the case of measurement over a wider range, by recording GPS information with image data, it is easily found at which place the image is photographed.

Here, as another effect, when measurement is performed by photographing while moving, by measuring a distance of the same position over a plurality of frames, measurement accuracy is able to be improved. For example, FIG. 6(*b*) illustrates an image photographed by moving frontward from the photographing position of FIG. 5(*a*), in which the measurement point P1L and the measurement point P1R are a point at the same portion of an object. Here, when a three-dimensional position is computed from images having disparity, accuracy of a distance from the image capturing device to a target affects measurement accuracy. When computing the distance from the image capturing device to the target, a distance corresponding to a range within one pixel is not able to be discriminated basically, and a value thereof is referred to as distance resolution. By using a plurality of images for which a condition of a baseline length of the image capturing device and a distance to the image capturing device is changed, the distance resolution is able to be improved. A distance is typically detected with accuracy of one pixel or less from an image data group which is photographed with a plurality of different baseline lengths by fixing a distance to the target, which has the same meaning as changing of the distance to the target with the baseline length fixed. Here, though a method thereof will not be described in detail, accuracy is able to be enhanced as long as a plurality of images, for which a condition of a baseline length and a distance to a target is changed, as described above are able to be obtained. In the invention, even in the case of performing photographing while moving, a measurement portion is able to be detected, measurement points for the same portion are able to be extracted in images of a plurality of frames, and the method for enhancing accuracy as described above is applicable. By performing measurement of a distance when a position is changed according to movement of a photographing position and measurement of a distance of the same portion in a plurality of frames in parallel, measurement between two regions over a wide range is able to be performed more accurately.

In this manner, according to the image capturing device of the present embodiment, even when a measurement portion is over a wide range, a distance of a desired region is able to be acquired by designating the region with a simple operation from the user.

Second Embodiment

An image measurement device according to a second embodiment of the invention will be described. The second embodiment is a device capable of measuring distance to a plane region easily, and by following a measurement target which is designated in a first measurement region and measuring a distance to a plane which is designated as a second measurement region chronologically, change in a distance (height) between an object which is moving on the plane and the plane is able to be measured.

Figure 7:
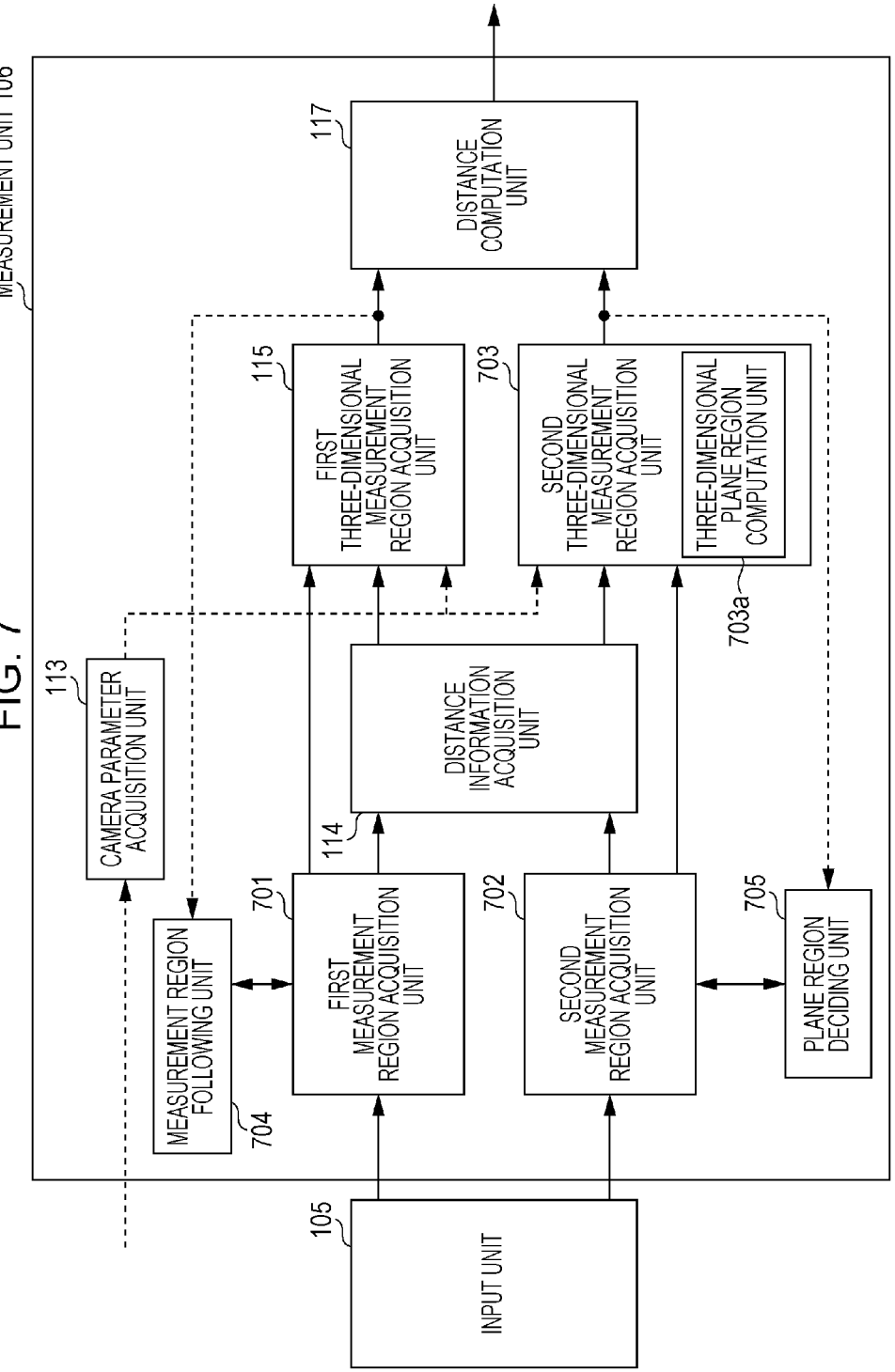
FIG. 7 is a functional block diagram illustrating a configuration example of a measurement unit of an image measurement device according to an embodiment of the invention.

A configuration of an image capturing device in the second embodiment is almost similar to the configuration illustrated in FIG. 1, and the image capturing device 13 has the imaging unit 101, the image processing unit 102, the recording unit 103, the display unit 104, the input unit 105, and the measurement unit 106. Detailed description of each unit is similar and therefore omitted. Next, a configuration of the measurement unit 106 is illustrated in FIG. 7. The measurement unit 106 in the second embodiment includes a first measurement region acquisition unit 701, a second measurement region acquisition unit 702, the camera parameter acquisition unit 113, the distance information acquisition unit 114, the first three-dimensional position acquisition unit 115, a second three-dimensional region acquisition unit 703, the distance information computation unit 117, a measurement region following unit 704, and a plane region deciding unit 705, and computes a distance between a measurement region 1 and a plane region. A measurement result which is computed is displayed on the display unit 104. Components having the same view numbers as those in FIG. 2 perform similar processing.

Figure 8:
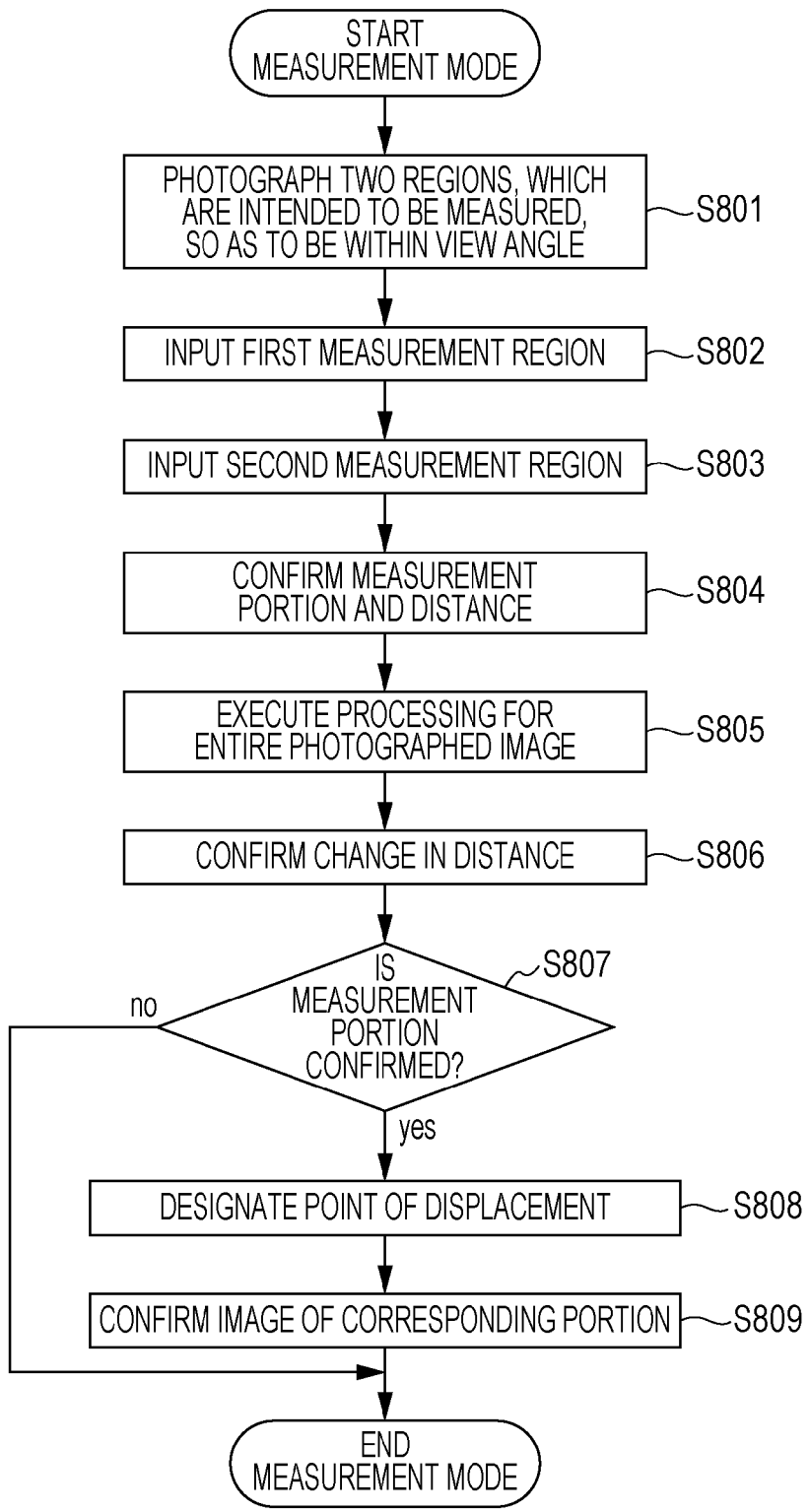
FIG. 8 is a flowchart illustrating operation procedure in measurement and illustrating a flow from photographing of a measurement target to confirmation of a measurement result.

Each operation will be described below in detail while explaining an entire flow of measurement in the present embodiment. In the present embodiment, with a part of a form analysis in sports as a case example, description will be given with an example of measuring vertical motion of a waist of a runner who is running, that is, measuring a distance between the waist of the runner and a ground surface. FIG. 8 illustrates operation procedure in measurement and is a flowchart illustrating a flow from photographing of a measurement target to confirmation of a measurement result.

Here, description will be given by assuming that a target runner who is running is photographed and a measurement unit is designated after the photographing to measure a distance. When a start of a measurement mode of the image capturing device is detected, regions of a measurement target are photographed by the image capturing device 13 (S801). A part of an image obtained by photographing the measurement target at this time is illustrated in FIG. 9(a). In FIG. 9(a), a runner 901, a ground surface 903a, and an object 902 in a background are photographed. Since a distance between a waist and the ground surface is necessary, photographing is performed so that the two regions fall within a view angle. The runner 901 who is running is photographed under such a condition. Further, when the runner 901 moves greatly, the photographing is performed by moving the image capturing device in accordance with the runner 901. Even if the runner 901 moves greatly and falls out of the view angle, the runner 901 is automatically followed when falling within the view angle. FIG. 9(b) is an image which is obtained by photographing the runner after t seconds, and illustrates a situation where the runner moved in a right direction from FIG. 9(a) and thus a photographing position was moved accordingly. Here, an object having the same number is regarded as being the same in FIGS. 9(a) and (b).

When the photographing is finished, first, a first measurement region is designated to designate a measurement portion of a distance. Here, for measuring a distance between a waist position of the person 901 and the ground surface 903a, a waist position region of the person 901 is designated in designation of the first measurement region (S802). For designating a measurement region, selection is able to be performed by designating a region on an image which is displayed.

Figure 10:
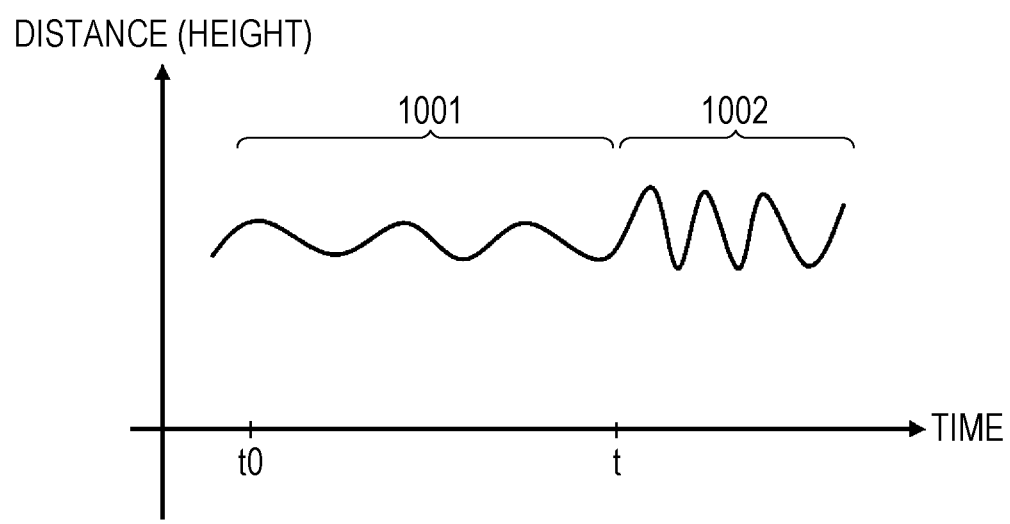
FIG. 10 is an example indicating displacement in a result of distance measurement.

Next, the ground surface 903a is designated to designate a second measurement region (S803). As a method for designating the ground surface, for example, by designating a part of the ground surface 903a so as to surround with a circle, the same plane region which is continuous to the surrounded region is extracted, thus making it possible to designate the plane region easily. When the first measurement region and the second measurement region are designated, a distance between the two regions is measured and a measurement portion and a numerical value of the distance are displayed on a screen, so that the measurement portion and a measurement value thereof are able to be confirmed (S804). When the measurement target is a target of purpose, similar processing is executed for the entire photographed image (S805). In the case of photographing a moving image, a distance to the ground surface is measured for each frame, and static data thereof is able to be confirmed (S806). Here, distance measurement is automatically performed for each frame, and transition of distance data measured at each photographing time is made into a graph as illustrated in FIG. 10 and displayed on the display unit. When the measurement portion does not need to be confirmed, the measurement mode ends (no at S807). If there is a measurement result portion which is intended to be confirmed (yes at S807), corresponding images are able to be displayed easily from the measurement result. For example, it is assumed that two vertical motion patterns 1001 and 1002 are able to be confirmed with a time t as a boundary as illustrated in FIG. 10. When it is intended to confirm a form in the case of the vertical motion pattern 1002, corresponding images are able to be retrieved immediately because a measurement value and captured image data are associated (S808), and it is also possible to perform image reproduction of the images having the pattern 1002 with the measurement values (S809). In addition, also when it is intended to compare the patterns 1001 and 1002 from a result of distance measurement, the corresponding images are able to be searched for easily, thus making it also possible to confirm both the images by comparison easily. In this manner, in the present image measurement device, since an association relation between the captured image data and the measurement value is easily found, the images and the measurement values are able to be indicated so as to be easily understood visually. Further, since the measurement target is also able to be changed freely after photographing, it is also possible to measure distances of a plurality of portions with single photographing. For example, a plurality of measurement target portions may exist, such as when it is intended to confirm not only a center of gravity of the waist but also vertical motion of a cephalic part at the same time.

In this manner, only with photographing and simple designation of measurement regions, measurement of a distance between two regions becomes possible over a wide range. Further, it is possible to recognize of what portion a measurement value is obtained, by superposing and displaying on an actual photographed image.

A case where measurement is performed after photographing measurement regions first is indicated in the present embodiment, but without limitation thereto, it is possible to designate a target when photographing is started and acquire a measurement result in real time while performing photographing.

Next, a flow of processing of each component will be described by using FIG. 4 along the aforementioned operation procedure. A measurement mode starts, a measurement target is photographed, and photographed images are recorded (S401). At this time, images a and b having disparity, which are acquired by the imaging unit 101, are given to the image processing unit 102, subjected to adjustment of brightness and conversion into various data formats of a still image file such as JPEG and a moving image file such as MPEG, etc., and recorded in the recording unit 103. The photographed images are displayed on the display unit 104. Here, the photographed image by the imaging unit 101a which is arranged on a left side is set as a reference image and the reference image is to be displayed on the display unit 104. Next, the user designates a portion, which is intended to be measured, from the displayed image by the input unit 105, and acquires measurement region information on the photographed image by the first measurement region acquisition unit 701 and the second measurement region unit 702 (S402, S403). In the present embodiment, the display unit 104 is composed of a touch panel liquid crystal of an electrostatic capacitance type and is formed integrally with the input unit 105, but there is no limitation to the aforementioned method as long as being a method for selecting a desired region which is intended to be measured while visually recognizing the image, such as selecting with a key which moves a cursor displayed on the image.

At S402, feature point detection processing is performed for the image a by the first measurement region acquisition unit 701 and a feature amount in an input measurement region is acquired. The acquired feature amount is output to the measurement region following unit 704, and coordinate information of the measurement region is output to a disparity value computation unit and the first three-dimensional measurement region acquisition unit 115. At this time, it is desirable that the user is notified by superposing and displaying the selected measurement region on the image, thereby allowing confirmation as to whether to be the measurement region which is intended to be selected by the user.

Next, a plane region which is a second measurement region that is a target whose distance is intended to be measured is designated on the image (S403). Here, for designating a plane, by performing an operation to surround the plane region, points which have a feature in the plane region are extracted and the plane region is detected from three-dimensional positions thereof. For example, when it is intended to designate the ground surface 903a on which the runner 901 is running in FIG. 9(a), a region on the ground surface like a designated region 906 is designated. Feature point detection is performed in a range including the region which is designated and a plurality of points having a feature are computed. Then, three or more feature points are extracted from the computed plurality of feature points on the ground surface 903a. Here, a plurality of points including three points of points 907, 908, and 909 of FIG. 9(a) are extracted. Coordinates of the extracted feature points on the plane, which are extracted, are output to the plane region deciding unit 705, the distance information acquisition unit 114, and the second three-dimensional measurement region acquisition unit 703. Disparity values are computed by the distance information acquisition unit 114 from input coordinate information associated with the measurement region (S404). A method for computing the disparity value is similar to that of the first embodiment and therefore will not be described in detail.

The plane region may be designated by a method other than the above, and there is not constraint to the above as long as a method allows an easy input, for example, such as by displaying feature points in advance to cause feature points on a plane region as a measurement target to be selected. Further, there is no constraint to a size nor a shape of a region to be input, and may be at any place as long as a region in the plane.

Since many plane regions usually exist in a photographed image, it is difficult to identify a plane region which includes a measurement region, but by enabling designation with an easy input by the user, it is possible to acquire an appropriate plane region without failure.

The disparity values corresponding to the coordinates associated with each measurement region, which are computed by the distance information acquisition unit 114, are input to the first three-dimensional measurement region acquisition unit 115 and the second three-dimensional measurement region acquisition unit 703. The first three-dimensional measurement region acquisition unit 115 computes three-dimensional position information with the image capturing device as a reference from coordinates of a first measurement point on the image and the disparity values to output to the distance computation unit 117. The second three-dimensional measurement region acquisition unit 703 extracts three points for forming a plane from a plurality of pieces of coordinate information and disparity values in the plane region (ground surface 903a), which are input. Here, whether the disparity values are computed correctly is decided and points of a combination in which the respective three points are not arranged in parallel are extracted. In the case of block matching using SAD, the decision for the computation of the disparity values is performed, for example, by comparison of differences from SAD values of surrounding pixels when computing a smallest value of the SAD values. In the case of the block matching using SAD, as described above, the SAD values are obtained in turn and a pixel of interest which has a smallest value among them is set as the corresponding point, but the differences from the SAD values of the surrounding pixels are difficult to be obtained in a featureless region having only a little feature or a region of a repetitive pattern.

That is, when clear discrimination is possible, a peak of the smallest value occurs clearly as compared with the surrounding pixels, while when there is a few regions with high similarity on the periphery or there is a little feature, the SAD value of the surrounding pixel and the SAD value of the corresponding point become close values, so that a difference therebetween decreases. Therefore, by providing a certain threshold $\rho$, when the difference of the SAD value from that of the surrounding pixel is the threshold $\rho$ or less, it is regarded as having a little feature and it is decided that the disparity is not able to be computed, and when being the threshold $\rho$ or more, it is decided that the disparity value was able to be calculated correctly.

Here, the points 907, 908, and 909 of FIG. 9 are extracted and a three-dimensional plane region computation unit 703a performs computation of three-dimensional positions for the three points 907, 908, and 909 and outputs the three-dimensional positions to the distance computation unit 117 and the plane region deciding unit 705. The distance computation unit 117 computes a three-dimensional plane equation from three-dimensional information of the three points on the plane which is the second measurement region, which is input, and computes a distance to the three-dimensional coordinate of the first measurement region. An intersection of a straight line, which is orthogonal to the three-dimensional plane equation and passes through the three-dimensional coordinates of the first measurement region, and a three-dimensional plane may be computed to obtain a distance between the intersection and the three-dimensional coordinates of the first measurement region.

In this manner, a distance L1 between the first measurement region and the plane (ground surface 903a) which is the second measurement region is computed, and superposed and displayed on the image so as to allow confirmation.

Next, a case where the runner 901 moves with lapse of time will be described. First, a case of moving in a photographing range of FIG. 9(a) will be described.

In this case, a target of the first measurement region and the three points 907, 908, and 909 which form the plane remain within the view angle. The measurement region following unit 704 detects a movement amount of the measurement region from image data based on the feature amount input from the first measurement region acquisition unit 701 and acquires a coordinate position thereof. The measurement region following unit 704 always follows a position of an object that is the first measurement region in this manner to output the position to the first measurement region acquisition unit 701. The plane region deciding unit 705 follows the three points 907, 908, and 909 which form the plane in the photographed image and detects coordinate positions thereof. In this case, since the position of the image capturing device is not moved, the three points are arranged within the view angle. At this time, position information of the three points is used again for the plane position to compute a distance to the first measurement region.

Here, considered is a case where the runner 901 moves greatly. FIG. 9(b) is a photographed image after the runner moved greatly to a right direction, in which a photographing direction of the image capturing device was moved in accordance with the runner 901, so that the point 907 (FIG. 9(a)) among the three points which form the plane is out of the photographing range. In this case, a position of the plane is not able to be computed directly. Thus, when the point which forms the plane becomes out of the photographing range due to movement of the photographing position, the plane region deciding unit 705 detects a new feature point which is arranged on the same plane to acquire a continuous plane region. For example, the photographing position is moved from FIG. 9(a) to FIG. 9(b), the point 907 becomes out of the photographing range. The plane region deciding unit 705, which has detected the coordinate positions of the three points, detects a feature point from a region of a movement direction (right side in this case) at a time when the point 907 falls within a threshold n from an edge of the photographing range, computes a three-dimensional position thereof, and extracts a feature point 910 which exists on the same plane as the plane formed by the three points 907, 908, and 909. When the point 907 becomes out of the photographing range, the point 907 is newly replaced with a point 910 for computing a plane, and a distance L2 between a three-dimensional plane (ground surface 903b) formed by the three points 908, 909, and 910 and the first measurement region is computed similarly to the processing described above. In this manner, by automatically deciding whether to be the same plane as the designated second measurement region, even when the photographing position changes, the distance to the same plane is able to be measured over a wide range and a working by the user is not required.

Once the measurement region is able to be designated as described above, it is possible to acquire a distance between the same object and the plane from each frame and to confirm displacement thereof easily. Further, by superposing and displaying distance information on a corresponding image, it is possible to easily confirm at what scene what measurement result is obtained.

The first measurement region is set as the designated position of the object in the present embodiment, but may be a line segment having a region as described in the first embodiment. In this case, it is possible to measure a distance between a first measurement point on the line segment and a plane over a wide range.

In the first and second embodiments, the configurations and the like illustrated in the accompanying drawings are not limited to them, and may be modified appropriately within the range of exerting the effects of the invention. In addition, the invention may be modified appropriately and implemented without departing from the scope of the object of the invention.

Third Embodiment

In the present embodiments 1 and 2, when the distance information acquisition unit 114 acquires distance information, the distance information is computed from images having disparity, but means is not limited thereto as long as obtaining distance information corresponding to a photographed image region. For example, data indicating one photographed image and distance information in a real space for each region of the photographed image may be input. One example of the data indicating distance information includes a distance image indicating a relative value of distances of each pixel in a real space. In this case, the distance information acquisition unit 114 extracts distance information corresponding to a measurement region extracted from the distance image from the distance image data to output as the distance information. The distance computation unit 117 uses the acquired distance information and a parameter for converting it into a distance in a real space to convert into a distance in a three-dimensional space.

When being specified as an image capturing device, the invention includes various devices such as a mobile terminal (smartphone, a mobile telephone, a PC, or the like) having the image capturing device, a camera, and an information processing device which acquires a distance between two regions by demanding captured data from the image capturing device, and is not limited by a name of equipment.

Further, a program for realizing the functions described in the present embodiments may be recorded in a computer readable recording medium to perform the processing of each unit by causing a computer system to read and execute the program recorded in the recording medium. Note that, the "computer system" referred to here includes hardware for an OS, peripheral equipment and the like.

Moreover, the "computer system" includes a homepage providing environment (or display environment) when a WWW system is used.

Moreover, the "computer readable recording medium" refers to a portable medium such as a flexible disk, a magneto-optical disk, a ROM or a CD-ROM, or a storage device such as a hard disk built in the computer system. Furthermore, the "computer readable recording medium" includes one for holding a program dynamically for a short time period like a communication line in a case where a program is transmitted via a network such as the Internet or a communication line such as a telephone line, and one for holding a program for a fixed period of time like a volatile memory inside the computer system that is a server or a client in such a case. In addition, the aforementioned program may be one for realizing a part of the functions described above, and further may be one capable of realizing the functions described above in combination with a program which has been already recorded in the computer system. At least a part of the functions may be realized by hardware such as an integrated circuit.

APPENDIXES

The invention includes following disclosure.

(1) An image measurement device which has a first measurement region acquisition unit for acquiring a first measurement region from an image and a second measurement region acquisition unit for acquiring a second measurement region, which is different from the first measurement region, from the image, and computes a distance between the first measurement region and the second measurement region from distance information corresponding to the first measurement region and distance information corresponding to the second measurement region, the image measurement device including: a linear region following unit or a plane region deciding unit that causes a contour or a plane on the image, at which the second measurement region is positioned, to be displaced in the second measurement region in response to an operation from an input unit that causes the first measurement region to be displaced on the image; and a distance computation unit that computes a distance between the first measurement region after the displacement and the second measurement region after the displacement, which is displaced by the linear region following unit or the plane region deciding unit.

(2) The image measurement device according to item (1), in which in a first image and a second image which are photographed at different times, an object acquired on the first image, which is the same as the first measurement region, is detected from the second image and set as a second measurement region, and the second measurement region on the second image is set as a new first measurement region and a distance is computed.

(3) The image measurement device according to item (1), including a storage unit that stores distance information, which is computed by the distance computation unit, in association with displacement.

The distance information which is obtained by measurement over a wide range is saved in a recording unit and displacement information thereof is able to be confirmed on a display unit. Since an association among an image, a measurement portion, and a measured distance is able to be managed easily, a measurement result is able to be displayed in accordance with a purpose of a user.

(4) The image measurement device according to item (1), including a storage unit that stores distance information, which is computed by the distance computation unit, in association with an operation time.

(5) The image measurement device according to any one of items (1) to (4), in which in a case where a plurality of edge components are detected in the same region at a time of displacing a measurement point, a spatially close edge is extracted based on three-dimensional information acquired from a first three-dimensional measurement region acquisition unit and a second three-dimensional measurement region acquisition unit and judged as a continuous edge.

In this manner, by using not only edge information of a photographed image but also the three-dimensional position information, an edge which is not a measurement target is separated to acquire a target edge position accurately.

(6) An image measurement device which has a first measurement region acquisition unit for acquiring a first measurement region from an image and a second measurement region acquisition unit for acquiring a second measurement region, which is different from the first measurement region, from the image, and computes a distance between the first measurement region and the second measurement region from distance information corresponding to the first measurement region and distance information corresponding to the second measurement region, including: a measurement region following unit that, in response to an operation from an input unit by which the first measurement region is displaced on the image, detects a movement amount of the measurement region from image data based on a feature amount input from the first measurement region acquisition unit and acquiring a coordinate position thereof.

The measurement region following unit follows a position of an object including the first measurement region at all times in this manner to output the position to the first measurement region acquisition unit.

(7) The image measurement device according to item (6), further including a plane region deciding unit that follows at least three points which form a plane in a photographed image and detecting coordinate positions thereof.

(8) A measurement method by an image measurement device which has a first measurement region acquisition unit for acquiring a first measurement region from an image and a second measurement region acquisition unit for acquiring a second measurement region, which is different from the first measurement region, from the image, and computes a distance between the first measurement region and the second measurement region from distance information corresponding to the first measurement region and distance information corresponding to the second measurement region, including a distance computation step of, in a case where the first measurement region is displaced on the image in response to an operation from an input unit, displacing the second measurement region on a contour or a plane on the image, at which the second measurement region is positioned, and computing a distance between the first measurement region after the displacement and the second measurement region after the displacement.

(9) An image measurement method by an image measurement device which has a first measurement region acquisition unit for acquiring a first measurement region from an image and a second measurement region acquisition unit for acquiring a second measurement region, which is different from the first measurement region, from the image, and computes a distance between the first measurement region and the second measurement region from distance information corresponding to the first measurement region and distance information corresponding to the second measurement region, including: a measurement region following step of, in response to an operation from an input unit, by which the first measurement region is displaced on the image, detecting a movement amount of the measurement region from image data based on a feature amount input from the first measurement region acquisition unit and acquiring a coordinate position thereof.

(10) A program which causes a computer to execute the measurement method according to item (8) or (9).

(11) A computer readable recording medium which has the program according to item (10) stored therein.

INDUSTRIAL APPLICABILITY

The invention is able to be used for a length measurement device.

REFERENCE SIGNS LIST 10 image measurement system
11 image input device
12 image measurement device
13 image capturing device
14 reproducing device
15 communication/network
101 imaging unit
102 image processing unit
103 recording unit
104 display unit
105 input unit
106 measurement unit
111 first measurement region acquisition unit
112 second measurement region acquisition unit
113 camera parameter acquisition unit
114 distance information acquisition unit
115 first three-dimensional measurement region acquisition unit
116 second three-dimensional measurement region acquisition unit
117 distance computation unit
118 linear region following unit The entire contents of publications, patents, and patent applications cited in this description are incorporated by reference without any change.

The invention claimed is:

1. An image measurement device, comprising:
an input circuitry via which a region of an image is designated;
a first measurement region acquisition circuitry configured to acquire a first measurement region based on a first region designated via the input circuitry;
a second measurement region acquisition circuitry configured to acquire a second measurement region based on a second region designated via the input circuitry;
a distance computation circuitry configured to compute a real-space distance between the first measurement region and the second measurement region; and
a linear region following circuitry configured to detect and follow an edge of the image,
in accordance with an operation, inputted via the input circuitry, of displacing the first measurement region on a first object on which the first measurement region has been positioned, (i) the first measurement region acquisition circuitry acquiring a displaced first measurement region, (ii) the second measurement region acquisition circuitry acquiring a displaced second measurement region by displacing the second measurement region on a second object on which the second measurement region has been positioned, and (iii) the second measurement region being displaced on continuous edges, which are followed by the linear region following circuitry, so as to be the displaced second measurement region,
the distance computation circuitry being configured to compute a real-space distance between the displaced first measurement region and the displaced second measurement region.

2. The image measurement device according to claim 1, wherein
in a first image and a second image which are photographed at different times,
a region of the first object, on which the first measurement region is acquired on the first image, is detected from the second image, and
the region of the first object detected on the second image is set as a new first measurement region on the second image and a distance is computed.

3. The image measurement device according to claim 1, further comprising
a storage circuitry that stores distance information, which is computed by the distance computation circuitry, in association with displacement.

4. The image measurement device according to claim 1, further comprising
a storage circuitry that stores distance information, which is computed by the distance computation circuitry, in association with an operation time.

5. An image measurement device which has a first measurement region acquisition circuitry for acquiring a first measurement region from an image and a second measurement region acquisition circuitry for acquiring a second measurement region, which is different from the first measurement region, from the image, and computes a distance between the first measurement region and the second measurement region from distance information corresponding to the first measurement region and distance information corresponding to the second measurement region, the image measurement device comprising:

a distance computation circuitry that, after the first measurement region positioned on a first object is displaced so as to be a region on the first object in response to an operation from an input circuitry that causes the first measuring region to be displaced on the image and the second measurement region positioned on a second object is displaced in a region on the second object in accordance with an operation of a linear region following circuitry or a plane region deciding circuitry that causes a contour or a plane on the image, at which the second measurement region is positioned to be displaced, computes a distance between the first measurement region after the displacement and the second measurement region after the displacement, which is displaced by the linear region following circuitry or the plane region deciding circuitry,
in a case where a plurality of edge components are detected in the same region at a time of displacing a measurement point, a spatially close edge is being extracted based on three-dimensional information acquired from a first three-dimensional measurement region acquisition circuitry and a second three-dimensional measurement region acquisition circuitry and being judged as a continuous edge.

6. An image measurement device as set forth in claim 1, further comprising:
a second three-dimensional measurement region acquisition circuitry configured to acquire three-dimensional information,
in a case where a plurality of edge components are found within the same region of the image while the linear region following circuitry is following the continuous edges, the linear region following circuitry (i) determines, based on the three-dimensional information received from the second three-dimensional measurement region acquisition circuitry, edges which are spatially close to each other as continuous edges and (ii) follows the continuous edges.

7. A non-transitory computer-readable storage medium which stores therein an image measurement program for causing a computer to function as the image measurement device recited in claim 1,
the program causing the computer to function as each of the first measurement region acquisition circuitry, the second measurement region acquisition circuitry, the distance computation circuitry, and the linear region following circuitry.

8. The image measurement device according to claim 1, wherein
the first measurement region is a first measurement point, and
the second measurement region is a second measurement point.

9. An image measurement device, comprising:
an input circuitry via which a region of an image is designated;
a first measurement region acquisition circuitry configured to acquire a first measurement region based on a first region designated via the input circuitry;
a second measurement region acquisition circuitry configured to acquire a second measurement region based on a second region designated via the input circuitry;
a distance computation circuitry configured to compute a real-space distance between the first measurement region and the second measurement region; and
a plane region deciding circuitry configured to determine a plane region of the image, in accordance with an operation, inputted via the input circuitry, of displacing the first measurement region on a first object on which the first measurement region has been positioned, (i) the first measurement region acquisition circuitry acquiring a displaced first measurement region, (ii) the second measurement region acquisition circuitry acquiring a displaced second measurement region by displacing the second measurement region on a second object on which the second measurement region has been positioned, and (iii) the second measurement region being displaced on continuous planes, which are determined by the plane region deciding circuitry, so as to be the displaced second measurement region, the distance computation circuitry being configured to compute a real-space distance between the displaced first measurement region and the displaced second measurement region.

10. The image measurement device according to claim 9, wherein in a first image and a second image which are photographed at different times, a region of the first object, on which the first measurement region is acquired on the first image, is detected from the second image, and the region of the first object detected on the second image is set as a new first measurement region on the second image and a distance is computed.

11. The image measurement device according to claim 9, further comprising a storage circuitry that stores distance information, which is computed by the distance computation circuitry, in association with displacement.

12. The image measurement device according to claim 9, further comprising a storage circuitry that stores distance information, which is computed by the distance computation circuitry, in association with an operation time.

13. A non-transitory computer-readable storage medium which stores therein an image measurement program for causing a computer to function as the image measurement device recited in claim 9, the program causing the computer to function as each of the first measurement region acquisition circuitry, the second measurement region acquisition circuitry, the distance computation circuitry, and the plane region deciding circuitry.

14. The image measurement device according to claim 9, wherein the first measurement region is a first measurement point, and the second measurement region is a second measurement point.

* * * * *

UNITED STATES PATENT AND TRADEMARK OFFICE
CERTIFICATE OF CORRECTION

PATENT NO. : 10,074,179 B2
APPLICATION NO. : 14/888539
DATED : September 11, 2018
INVENTOR(S) : Shinichi Arita and Kei Tokui Page 1 of 1

It is certified that error appears in the above-identified patent and that said Letters Patent is hereby corrected as shown below:

On the Title Page

(30) Foreign Application Priority Data should read:
May 7, 2013 (JP) 2013-097837

Signed and Sealed this
Fifteenth Day of January, 2019

Andrei Iancu
*Director of the United States Patent and Trademark Office*